United States Patent [19]
Ozawa et al.

[11] Patent Number: 6,072,961
[45] Date of Patent: *Jun. 6, 2000

[54] CAMERA MODULE DEVICE FOR DATA RECORDING

[75] Inventors: Masaki Ozawa; Takashi Saegusa; Hirohisa Nakano; Shinsuke Itoh, all of Suwa, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/809,357

[22] PCT Filed: Jul. 17, 1996

[86] PCT No.: PCT/JP96/01982

§ 371 Date: May 6, 1997

§ 102(e) Date: May 6, 1997

[87] PCT Pub. No.: WO97/04351

PCT Pub. Date: Feb. 6, 1997

[30] Foreign Application Priority Data

Jul. 18, 1995 [JP] Japan ................................. 7-181968

[51] Int. Cl.[7] .................................................. G03B 17/24
[52] U.S. Cl. ........................ 396/310; 396/319; 396/320
[58] Field of Search ................................. 396/310, 319, 396/320

[56] References Cited

U.S. PATENT DOCUMENTS

| | | | |
|---|---|---|---|
| 4,947,196 | 8/1990 | Wash et al. | 396/320 |
| 5,130,728 | 7/1992 | Goto et al. | 396/319 |
| 5,307,100 | 4/1994 | Kubo | 396/319 |
| 5,335,029 | 8/1994 | Itoh et al. | 396/311 |
| 5,469,313 | 11/1995 | Isozaki et al. | 396/320 |
| 5,479,228 | 12/1995 | Tamamura et al. | 396/319 |
| 5,517,266 | 5/1996 | Funaki et al. | 396/319 |
| 5,565,935 | 10/1996 | Miura et al. | 396/310 |
| 5,600,385 | 2/1997 | Takeshita | 396/319 |
| 5,614,969 | 3/1997 | Izukawa | 396/319 |
| 5,666,186 | 9/1997 | Meyerhoefer et al. | 396/281 |
| 5,724,621 | 3/1998 | Serita et al. | 396/284 |
| 5,862,424 | 1/1999 | Moto-Oka et al. | 396/320 |

FOREIGN PATENT DOCUMENTS

| | | |
|---|---|---|
| 1-55036 | 10/1989 | Japan . |
| 6-11764 | 1/1994 | Japan . |
| 6-95234 | 4/1994 | Japan . |
| 6-138536 | 5/1994 | Japan . |
| 6-138540 | 5/1994 | Japan . |
| 6-332058 | 12/1994 | Japan . |
| 7-14981 | 4/1995 | Japan . |

Primary Examiner—Eddie C. Lee
Attorney, Agent, or Firm—Eric B. Janofsky

[57] ABSTRACT

Camera module device (1), which can be mounted onto a camera main body and that is used in a state in which it is mounted onto the camera main body, is provided with a circuit for generating data to be written, and thus camera main body (2) need not be equipped with a function for generating data to be written or a communication function for sending the generated data to camera module device (1). Camera main body (2) simply issues pulse signal X1 for a write instruction, and then data is generated by camera module device (1). Therefore, the camera main body can be made inexpensively. Furthermore, camera module device (1) is provided with a self-check function, and signal RD1 from camera main body (2) places this function in the active mode during photographic film loading. In this mode, circuit board (16) reads the data that has actually been written and determines whether or not the writing operation was performed correctly based on the comparison result of comparison circuit (162). Therefore, correct operation can always be guaranteed.

5 Claims, 33 Drawing Sheets

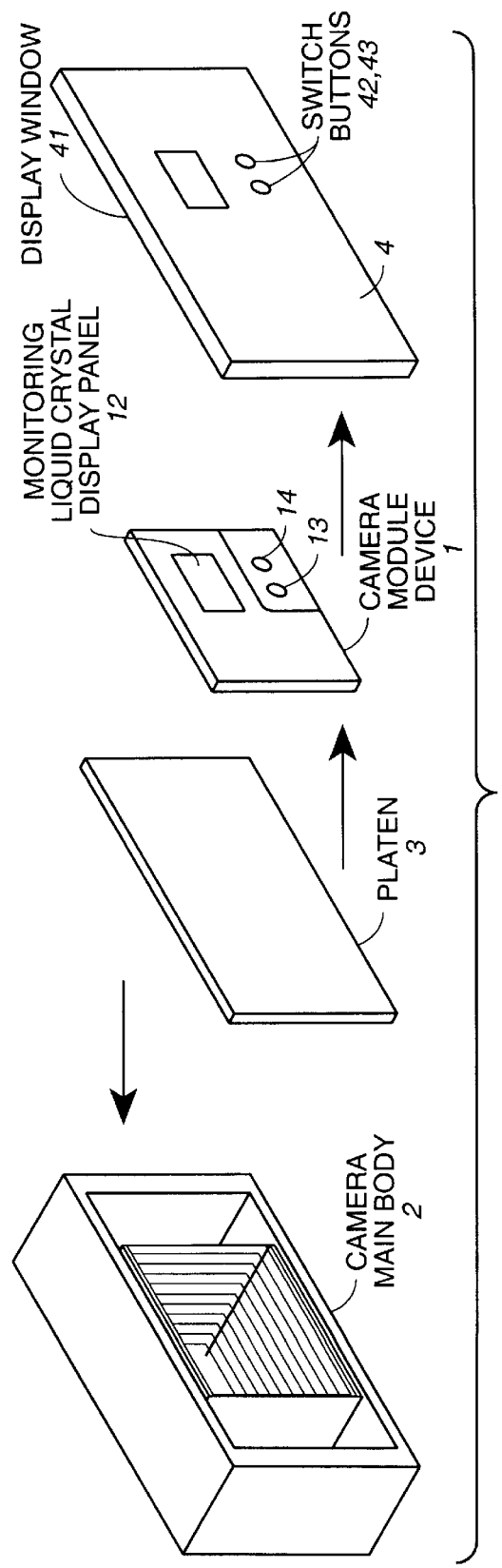
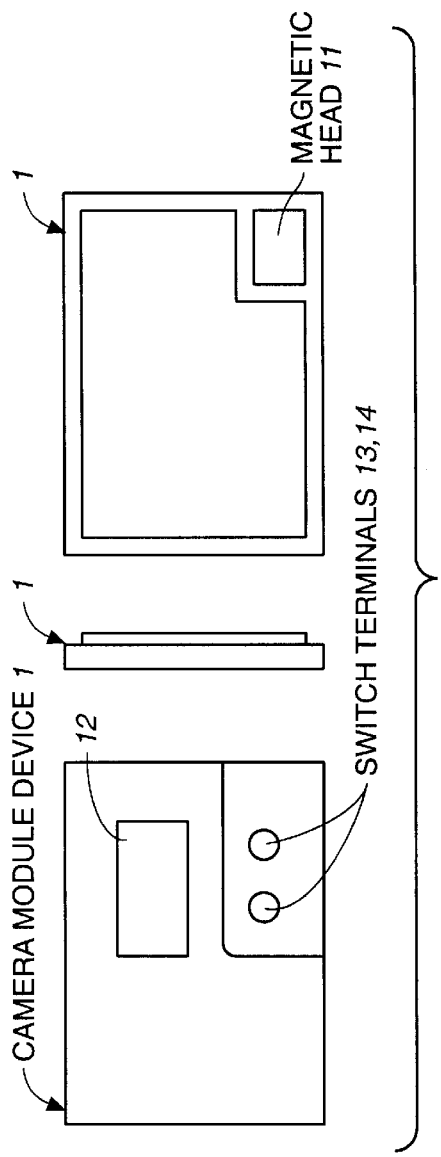
FIG._1A
FIG._1B

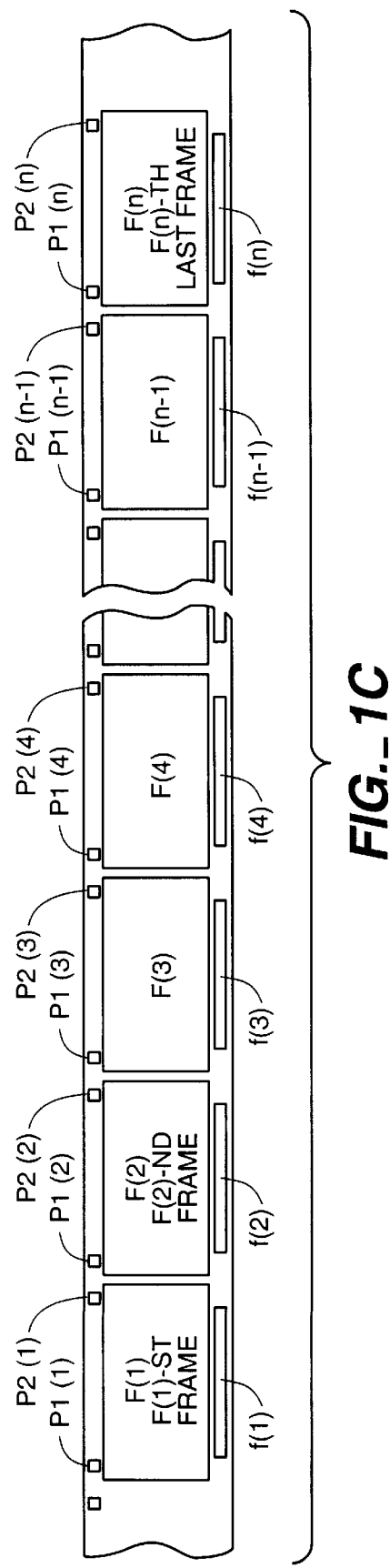
FIG._1C

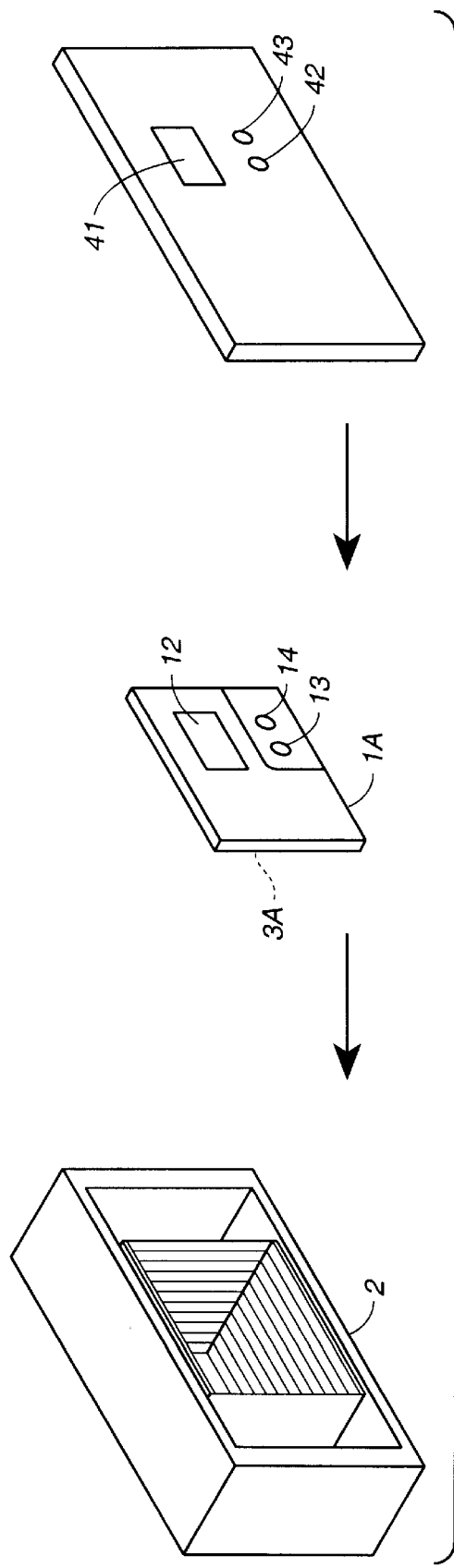
FIG._2A
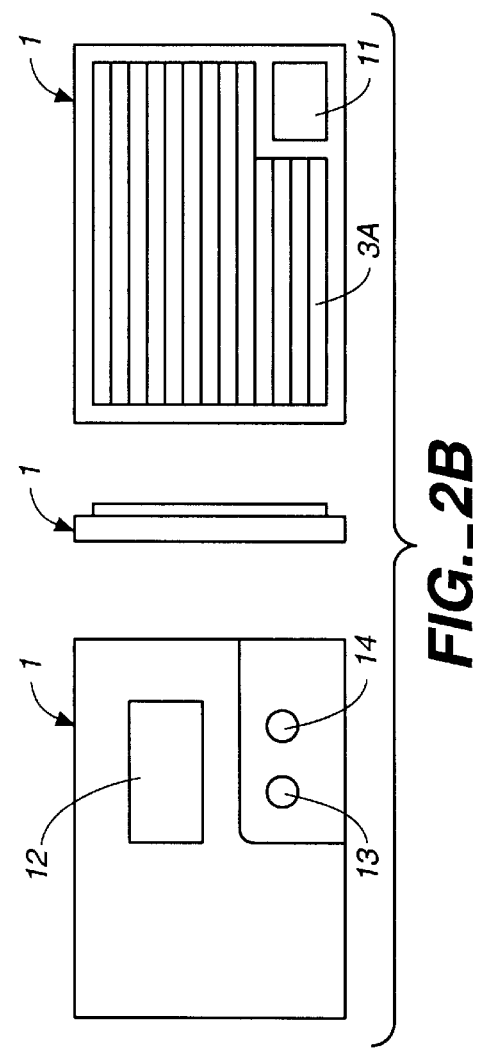
FIG._2B

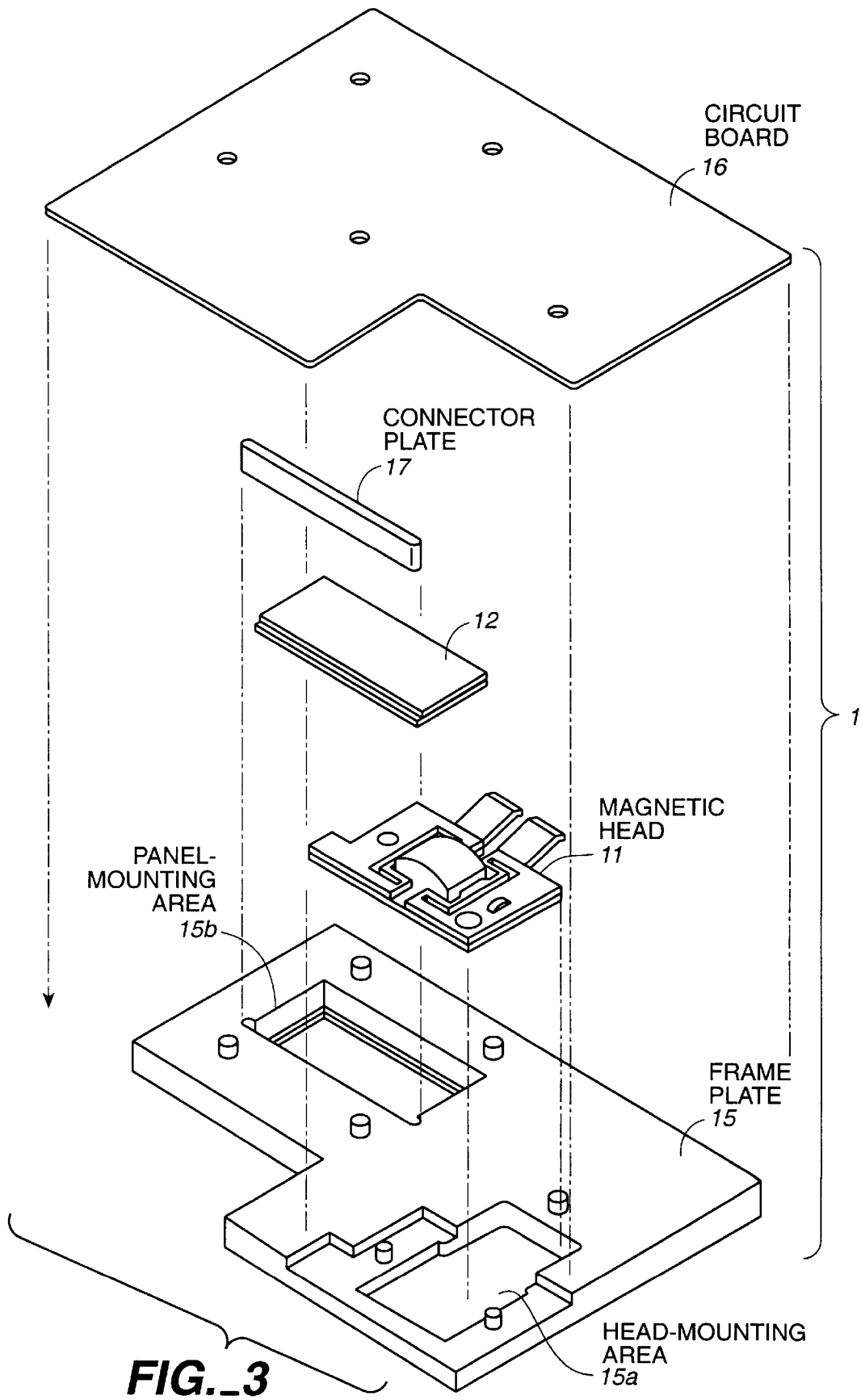
FIG._3

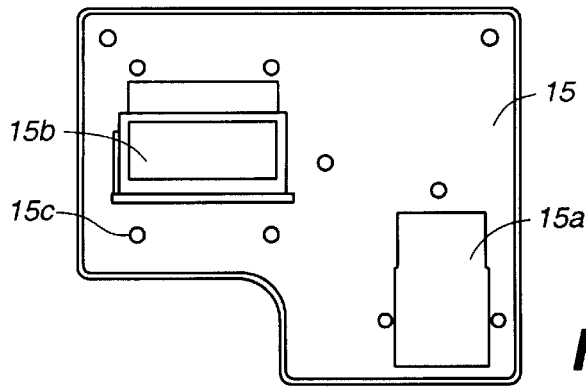
*FIG._4A*
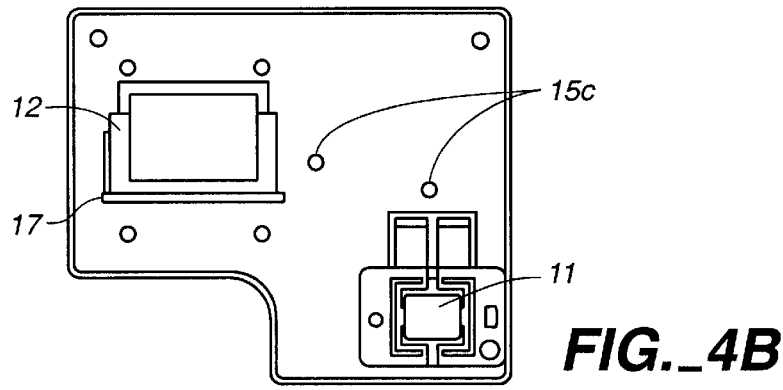
*FIG._4B*
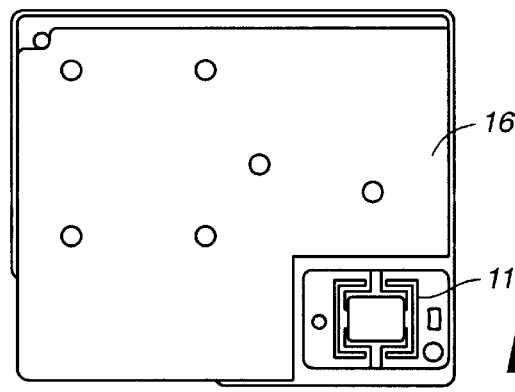
*FIG._4C*
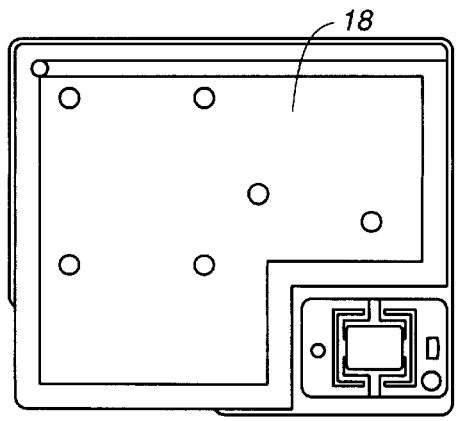
*FIG._4D*
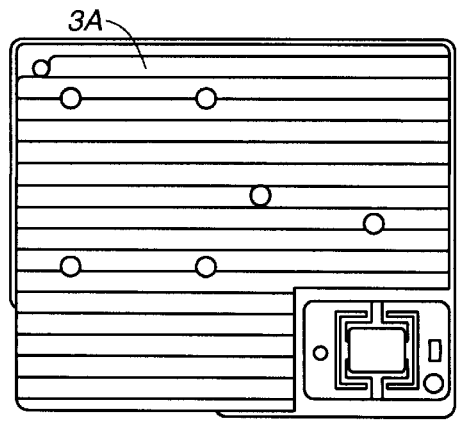
*FIG._4E*

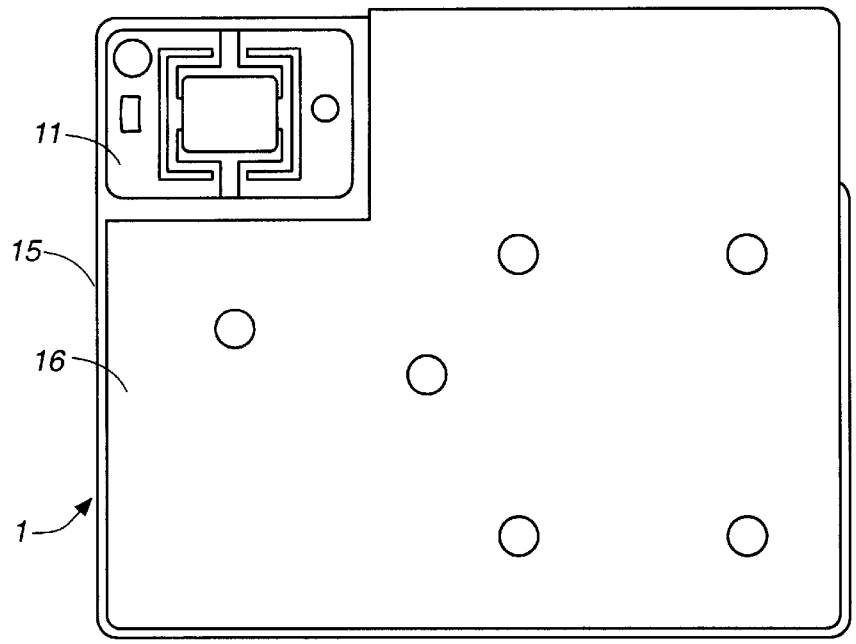
FIG._5A
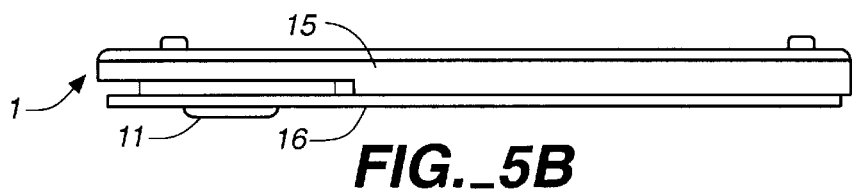
FIG._5B
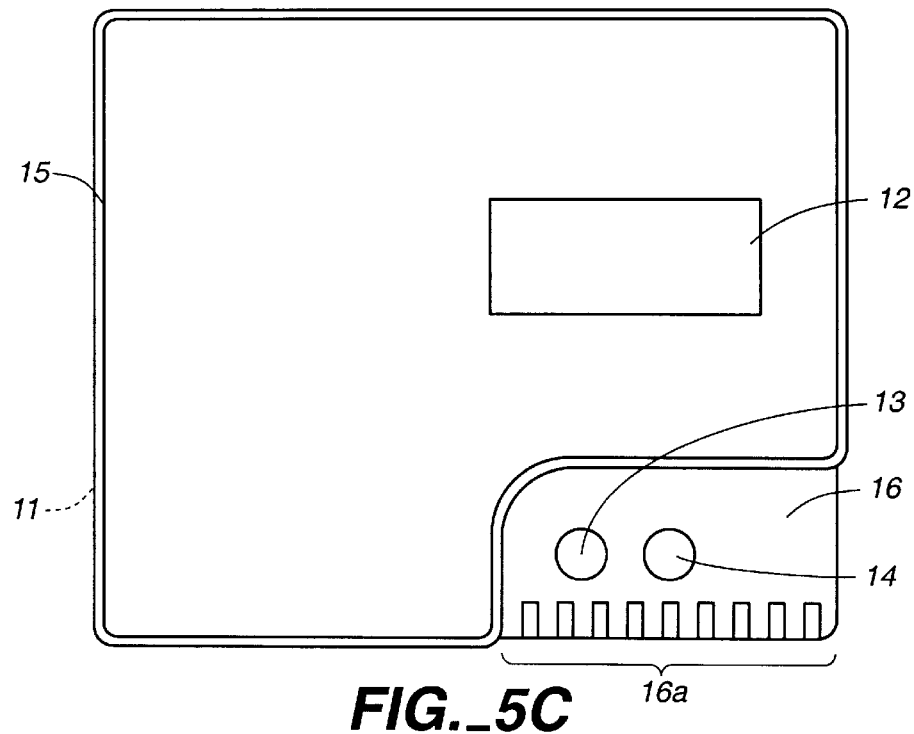
FIG._5C

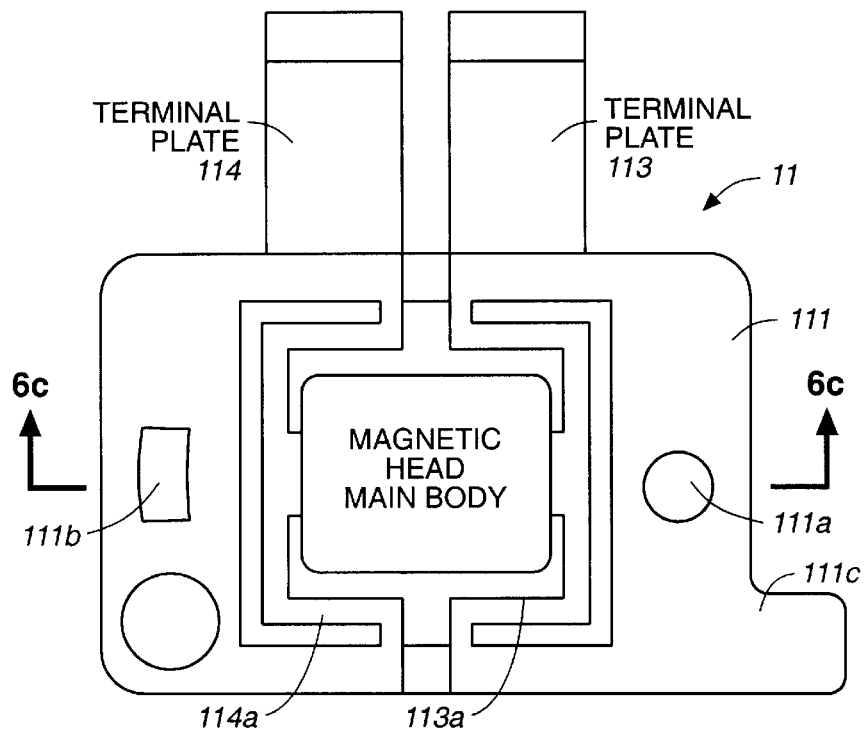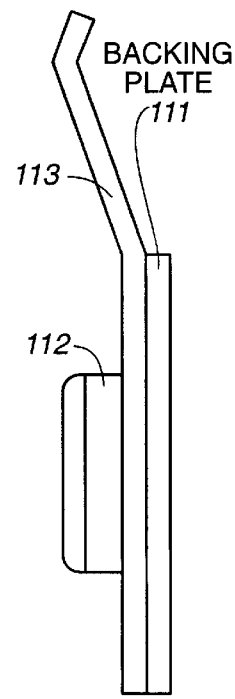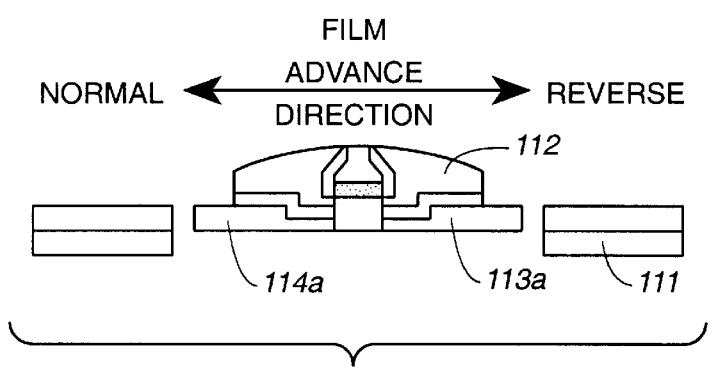
FIG._6A  FIG._6B
FIG._6C

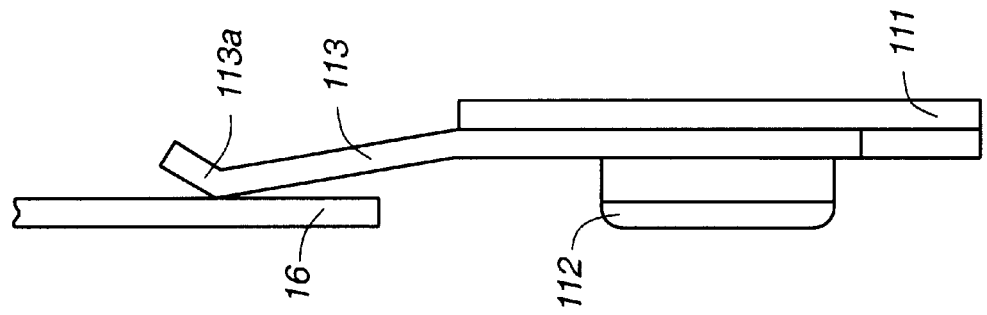
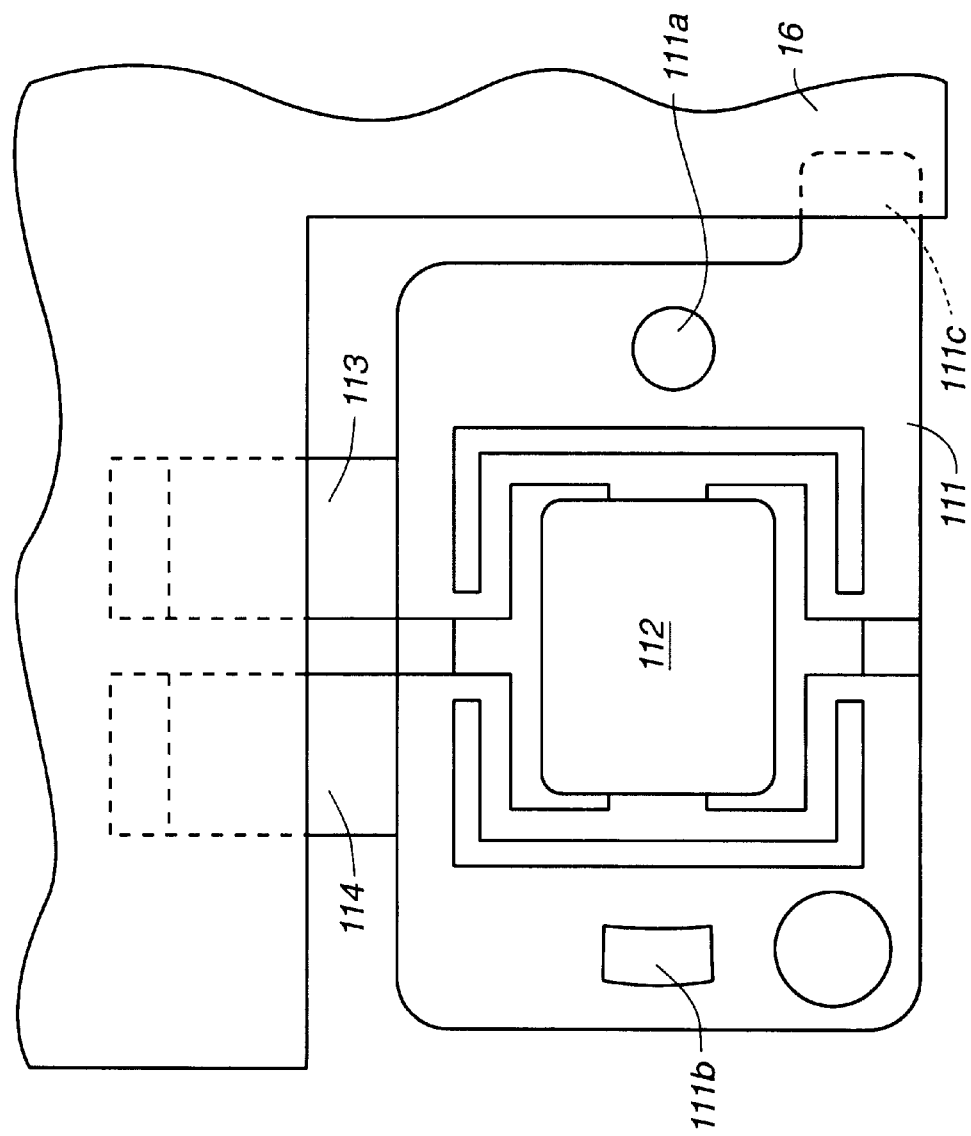

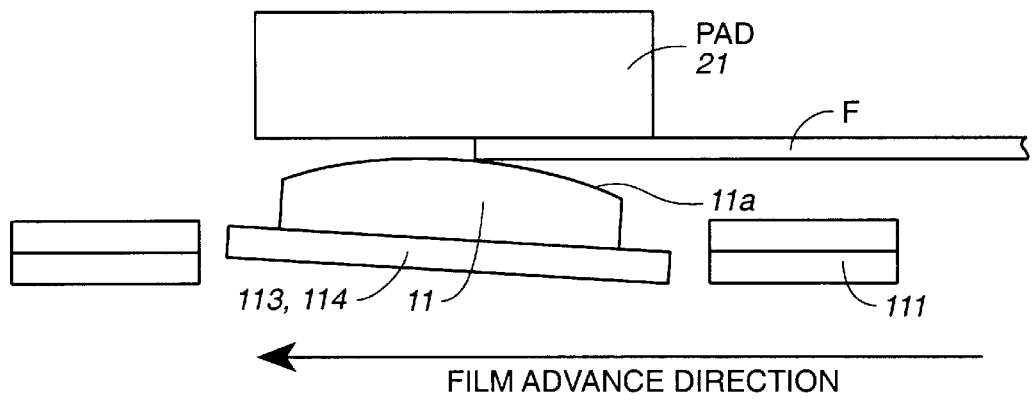
DURING FILM TIP ENTRY
FIG._8A
FIG._8B

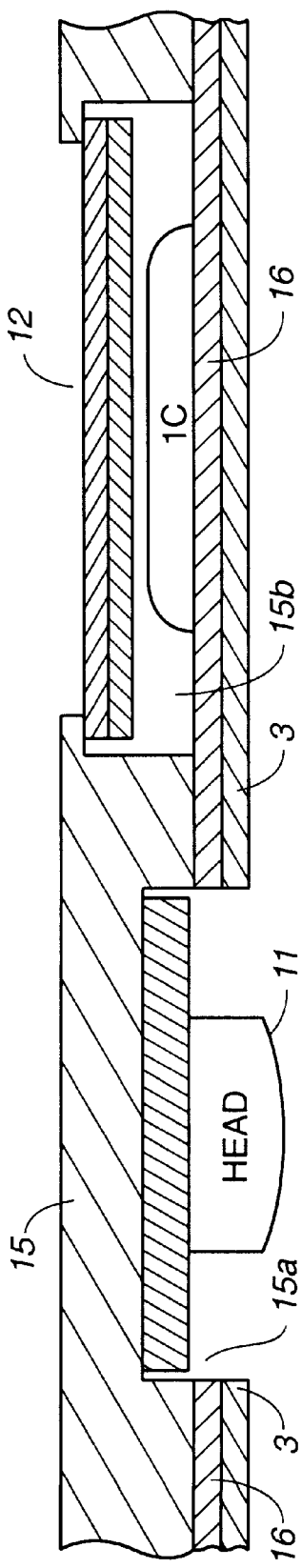
FIG._9A
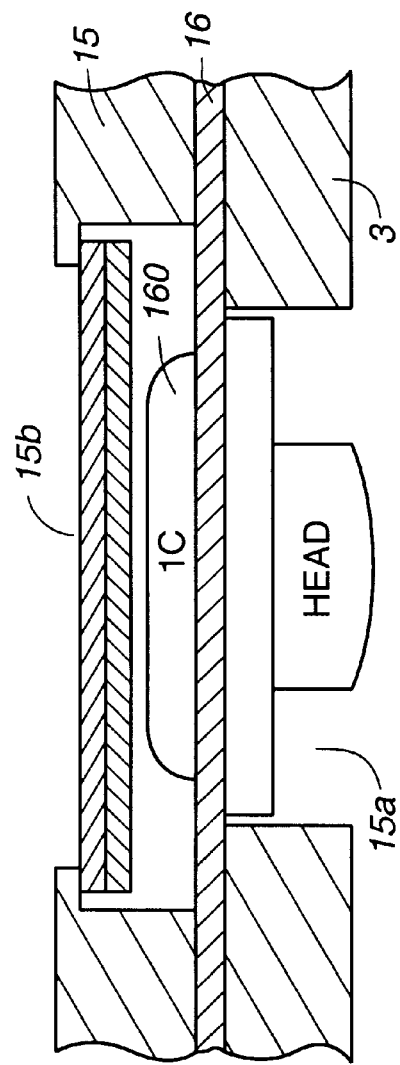
FIG._9B

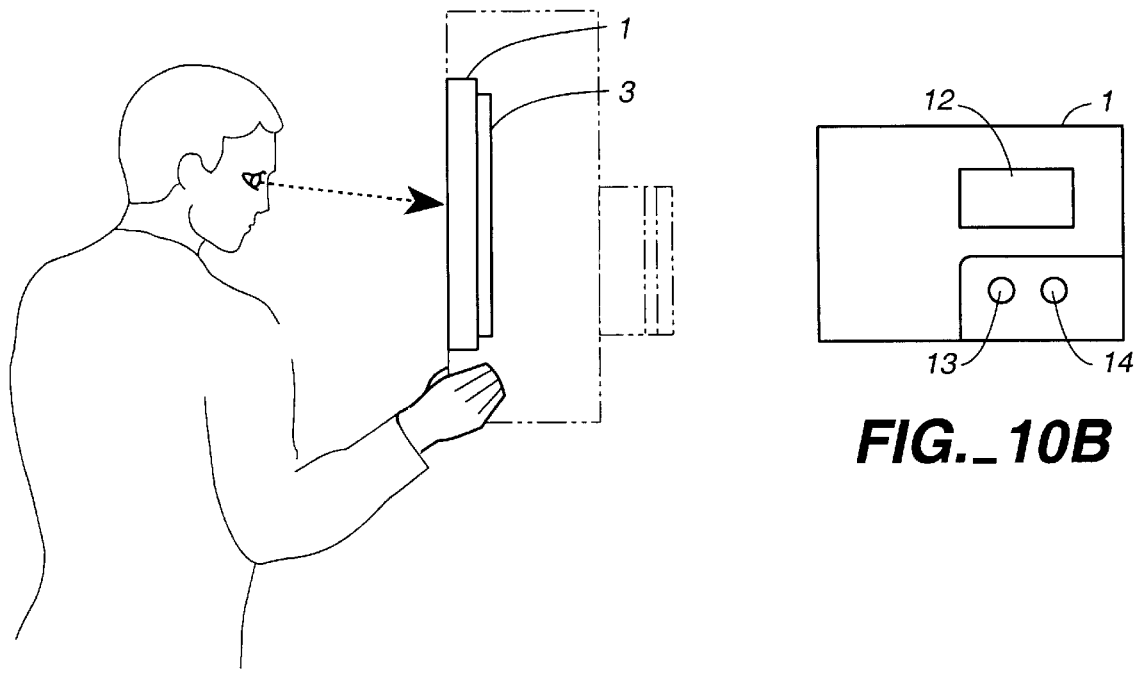
FIG._10A
FIG._10B
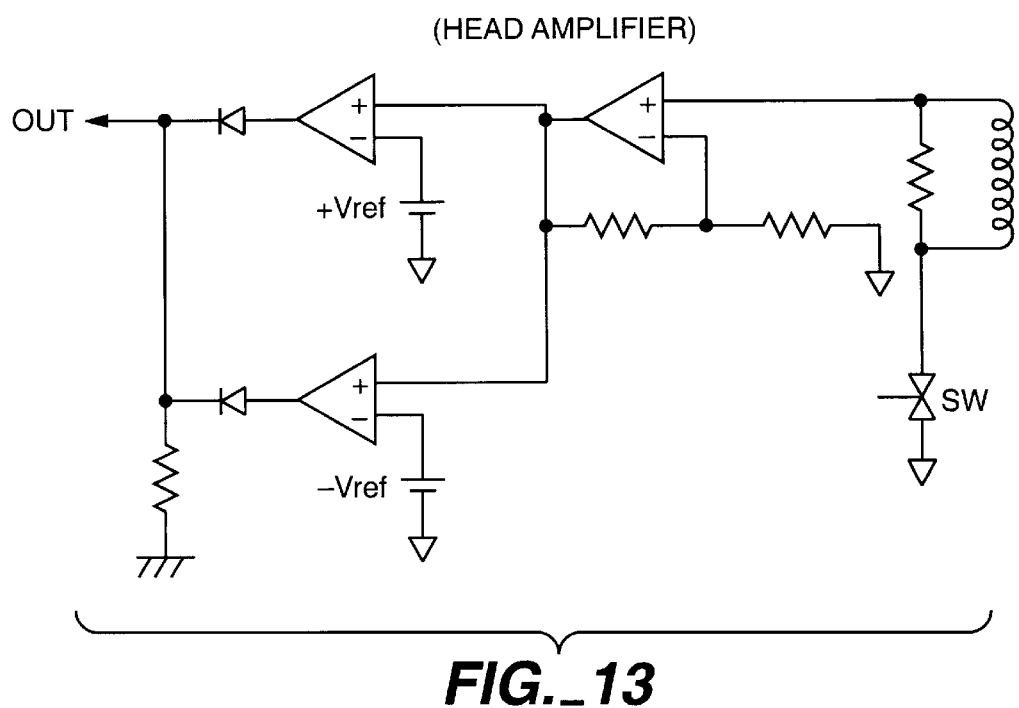
FIG._13

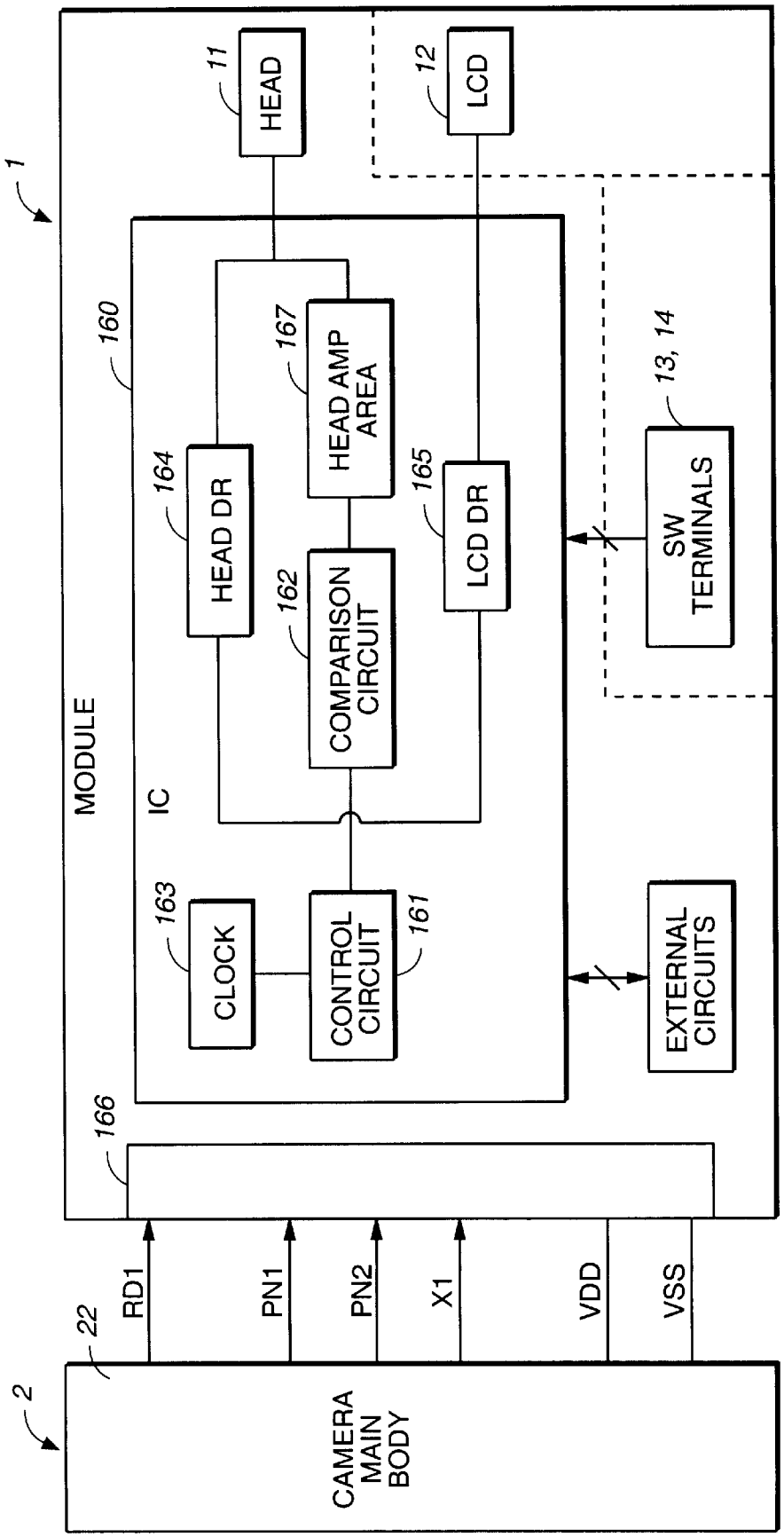
FIG._11

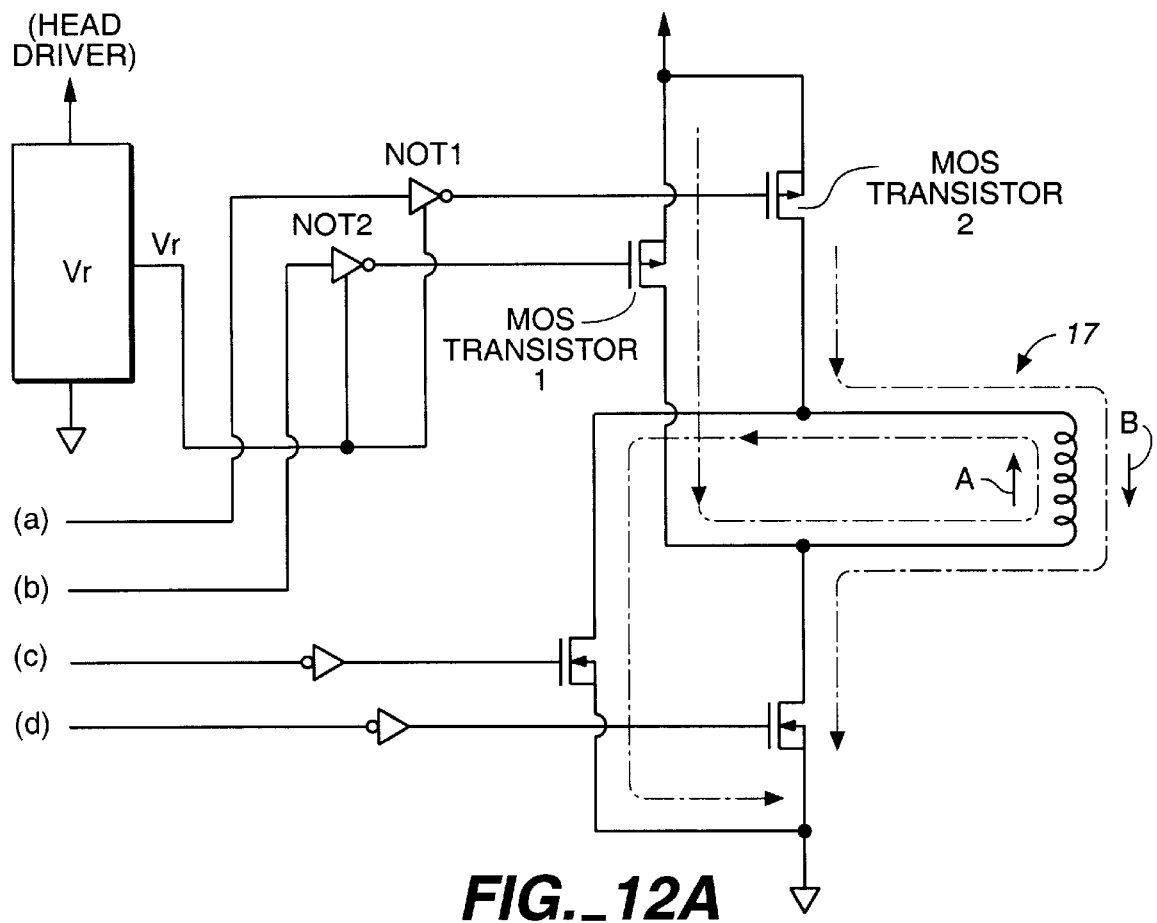
FIG._12A
| TERMINAL | LEVEL | |
|---|---|---|
| a | H | L |
| b | L | H |
| c | H | L |
| d | L | H |
| CURRENT | DIRECTION A | DIRECTION B |
FIG._12B

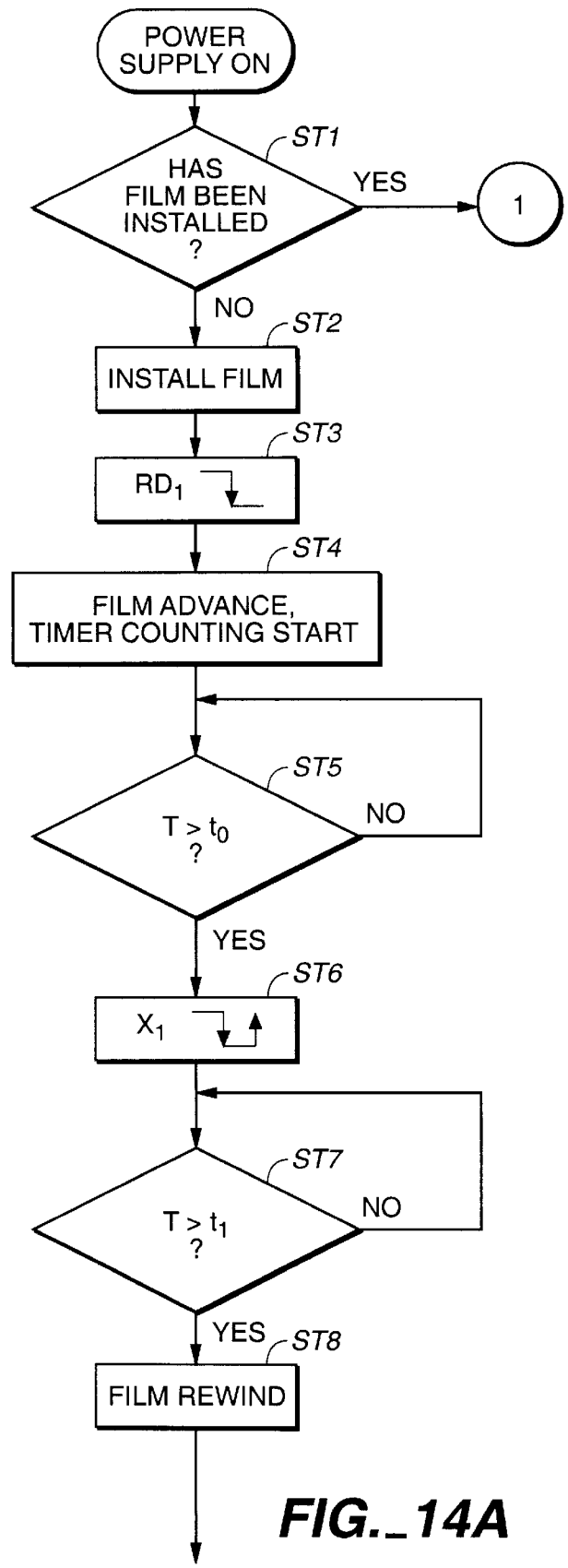
FIG._14A

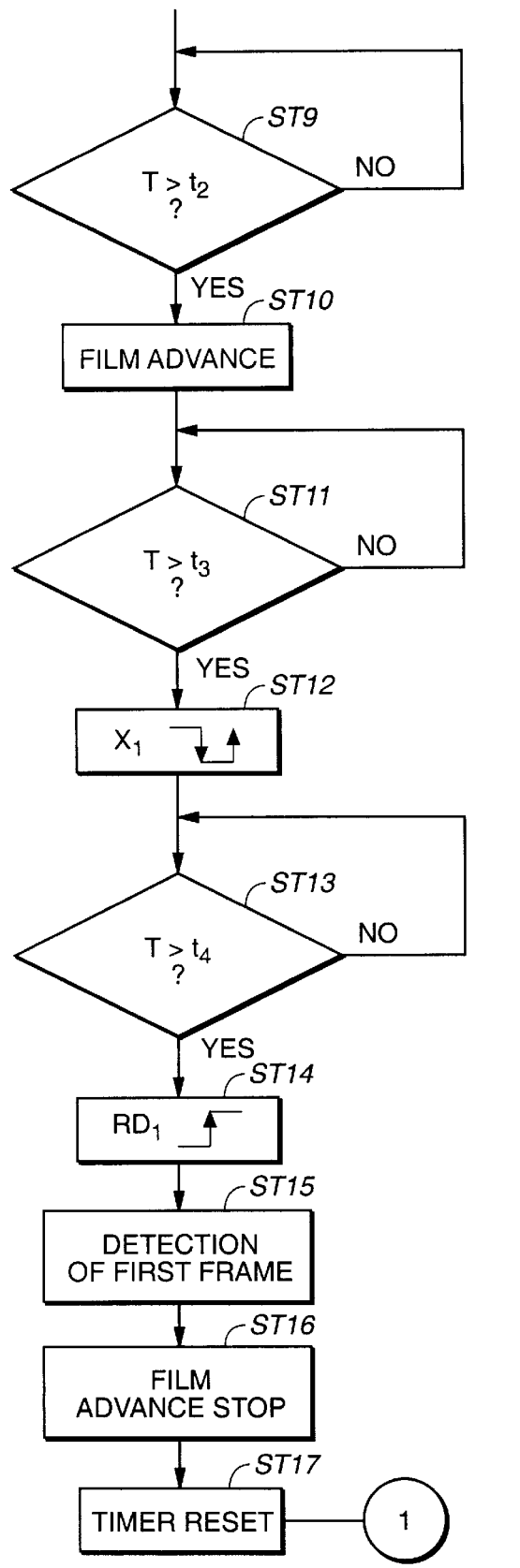
FIG._14B

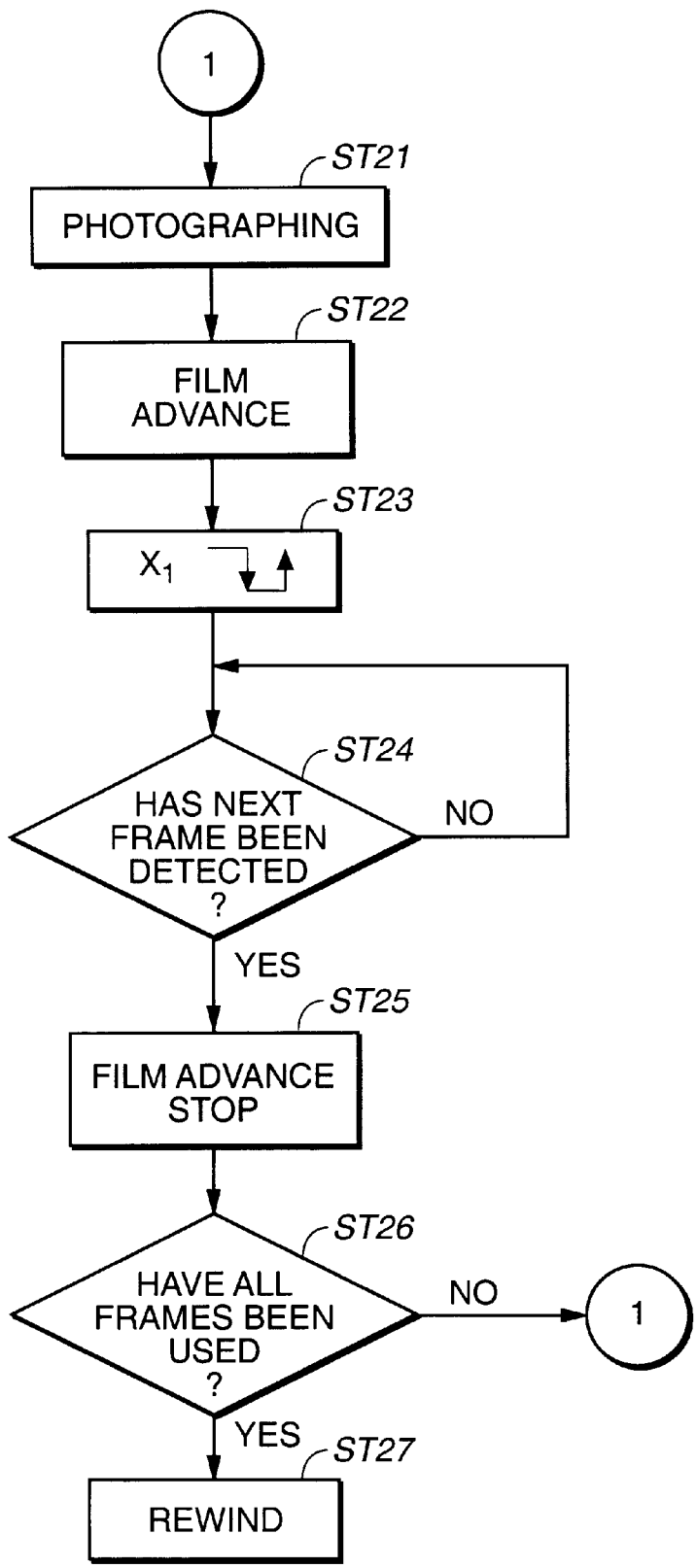
FIG._15

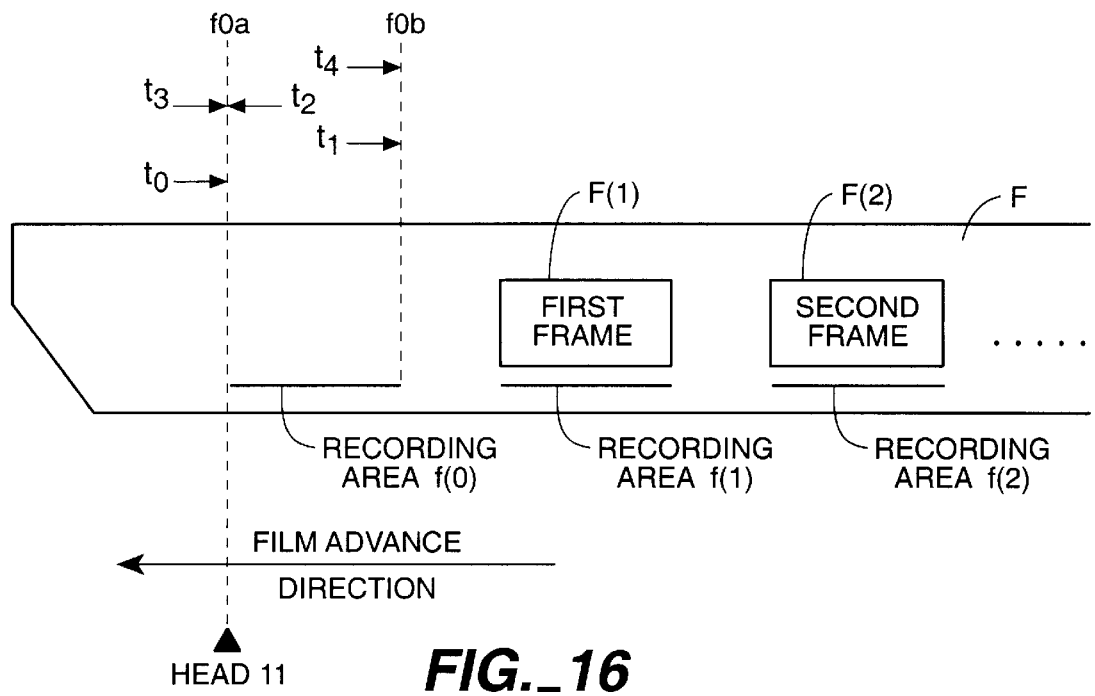
FIG._16
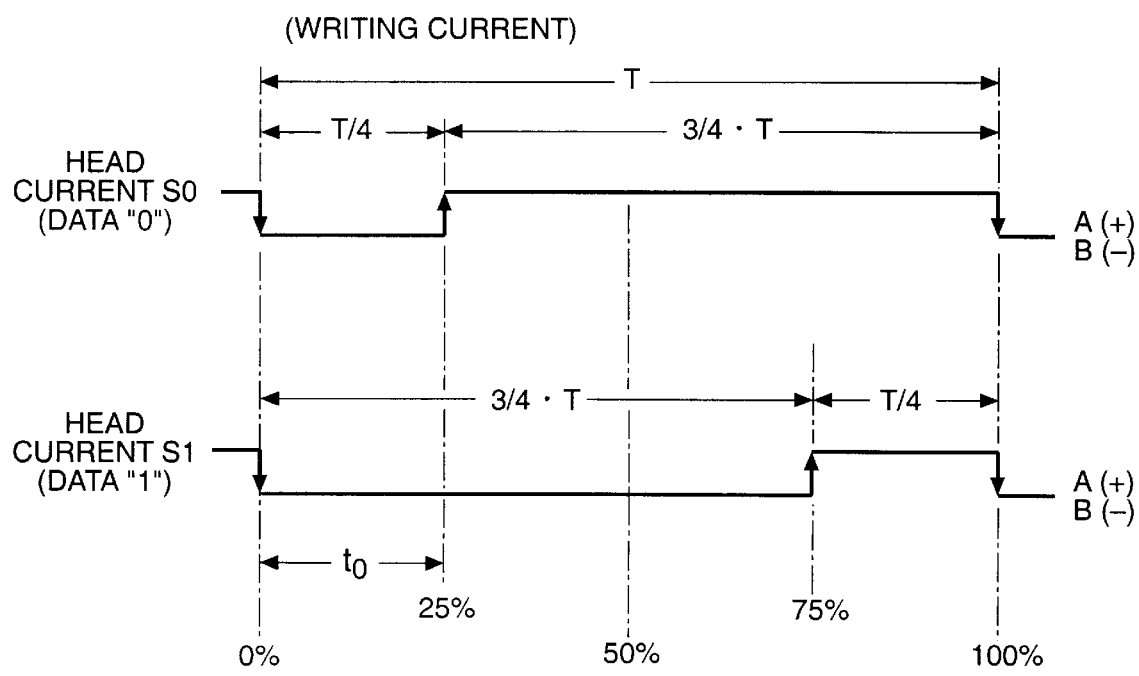
FIG._18

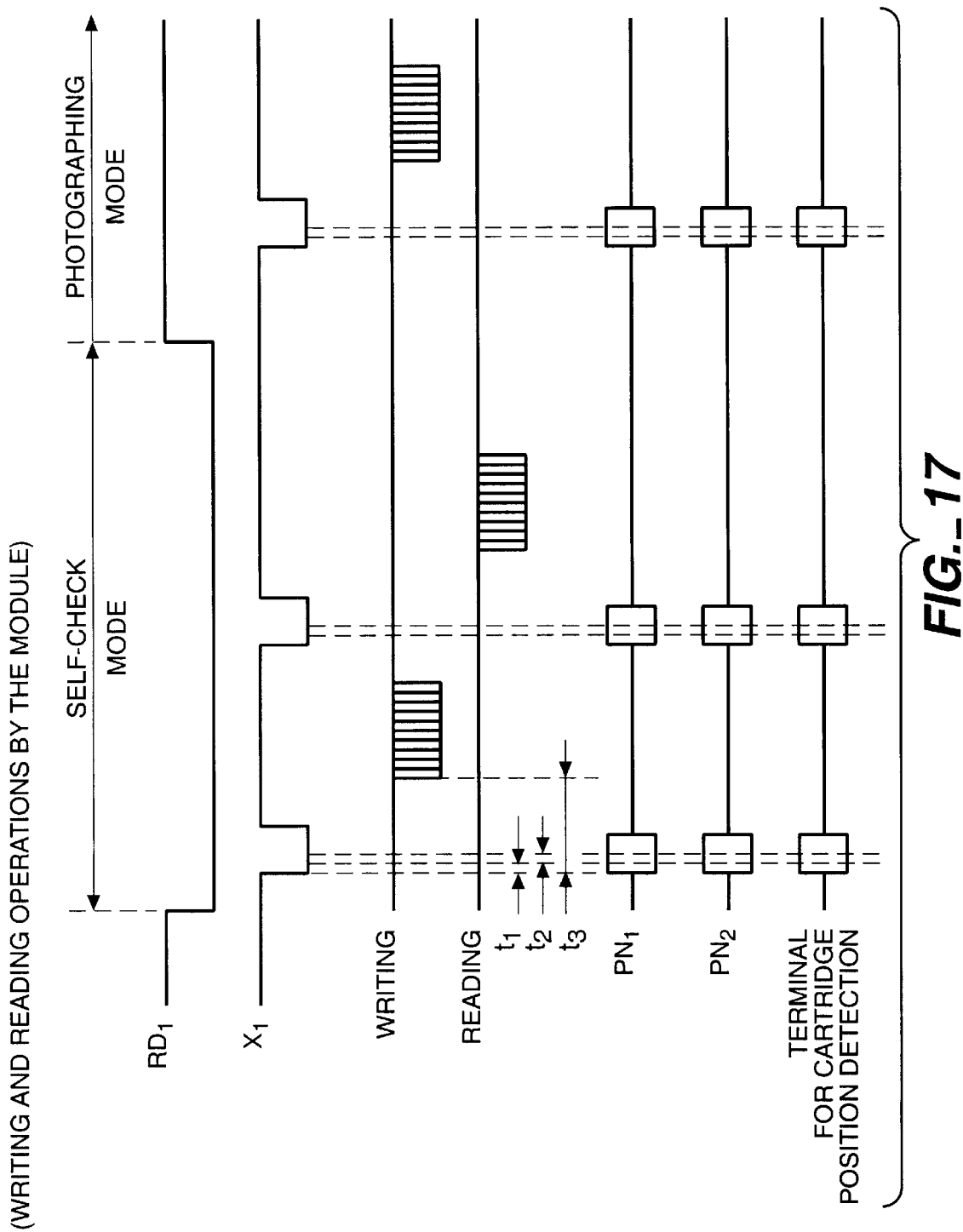
FIG._17

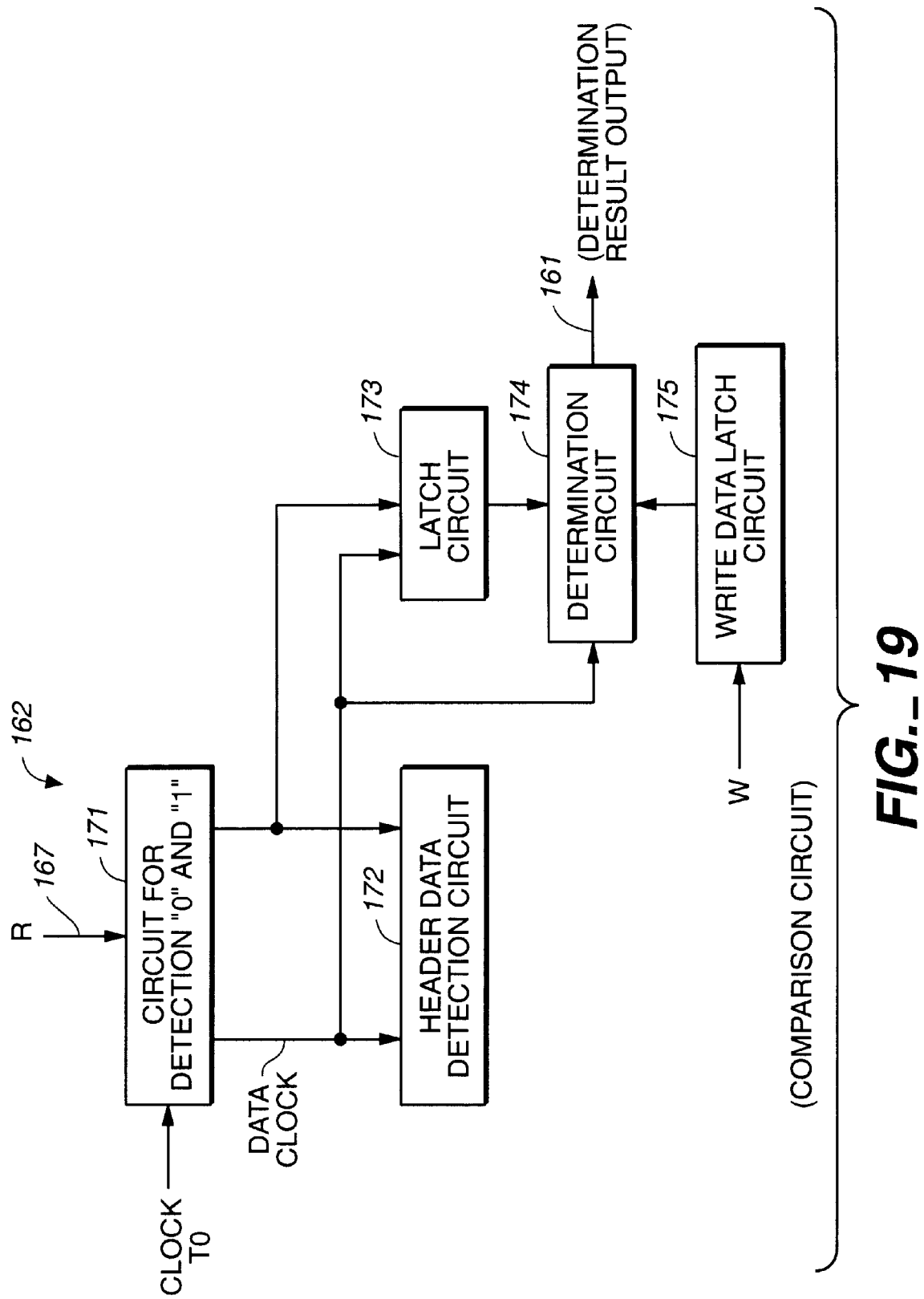
FIG._19

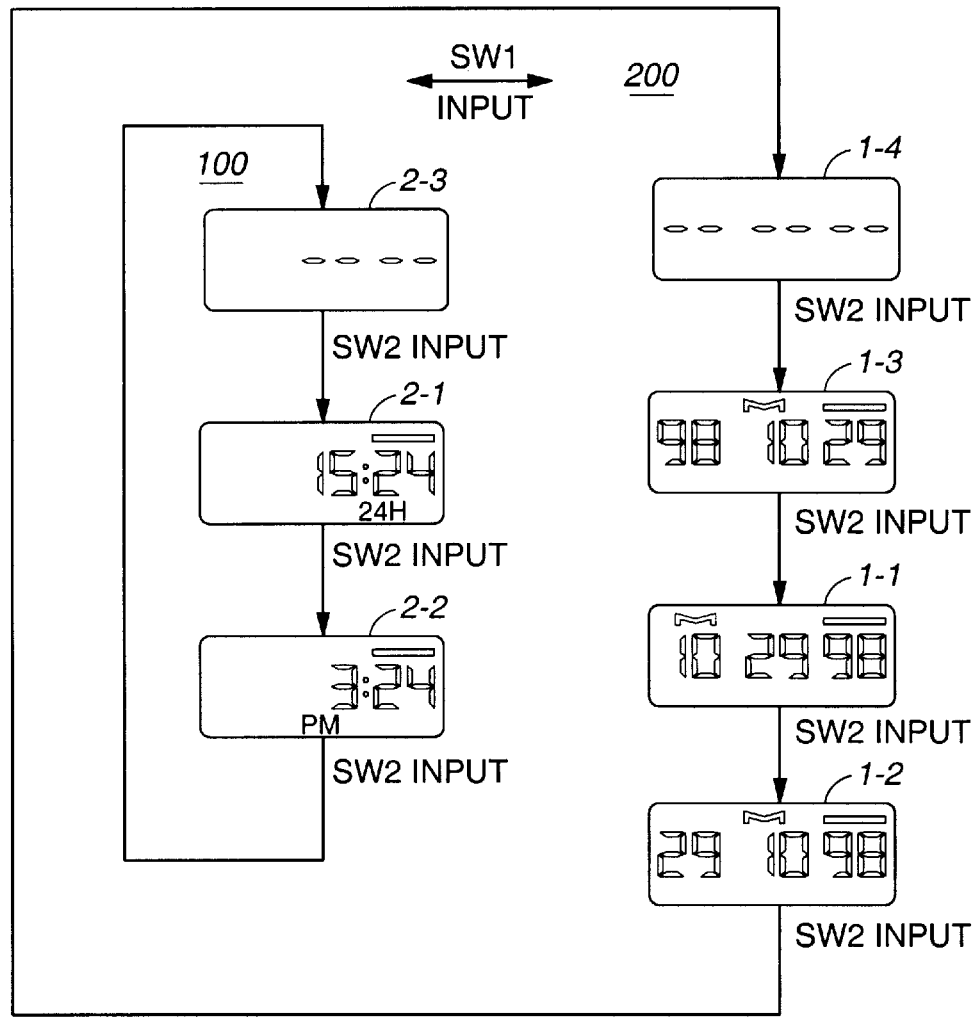
FIG._20A
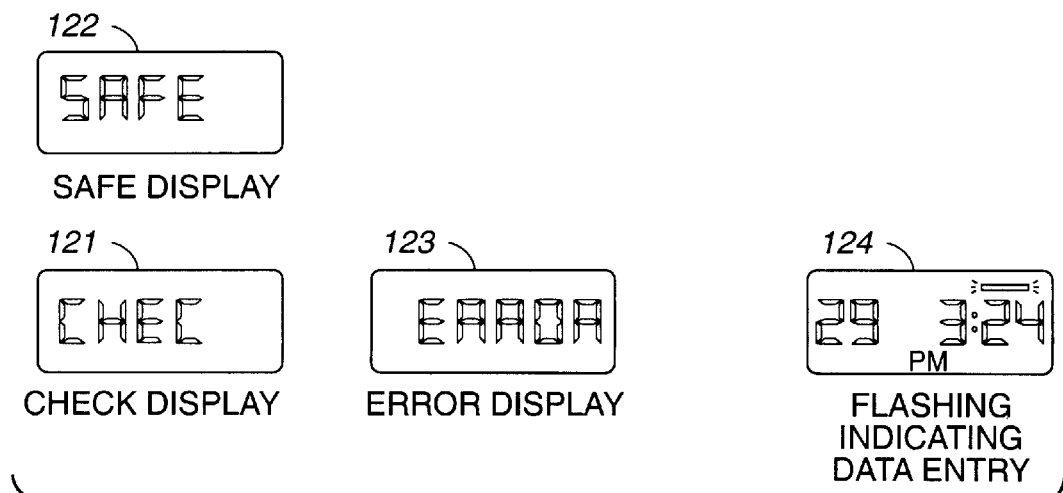
FIG._20B

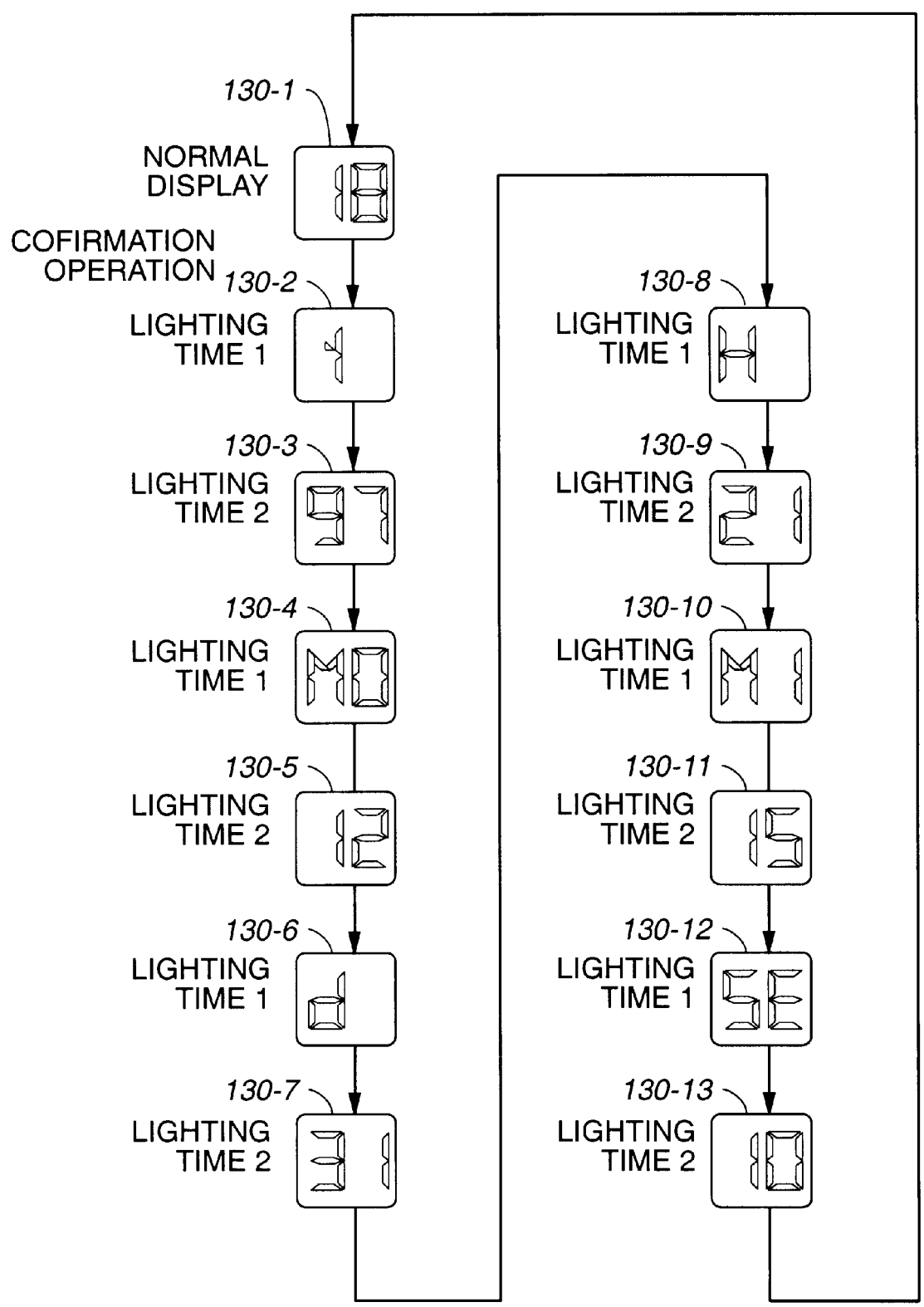
FIG._21

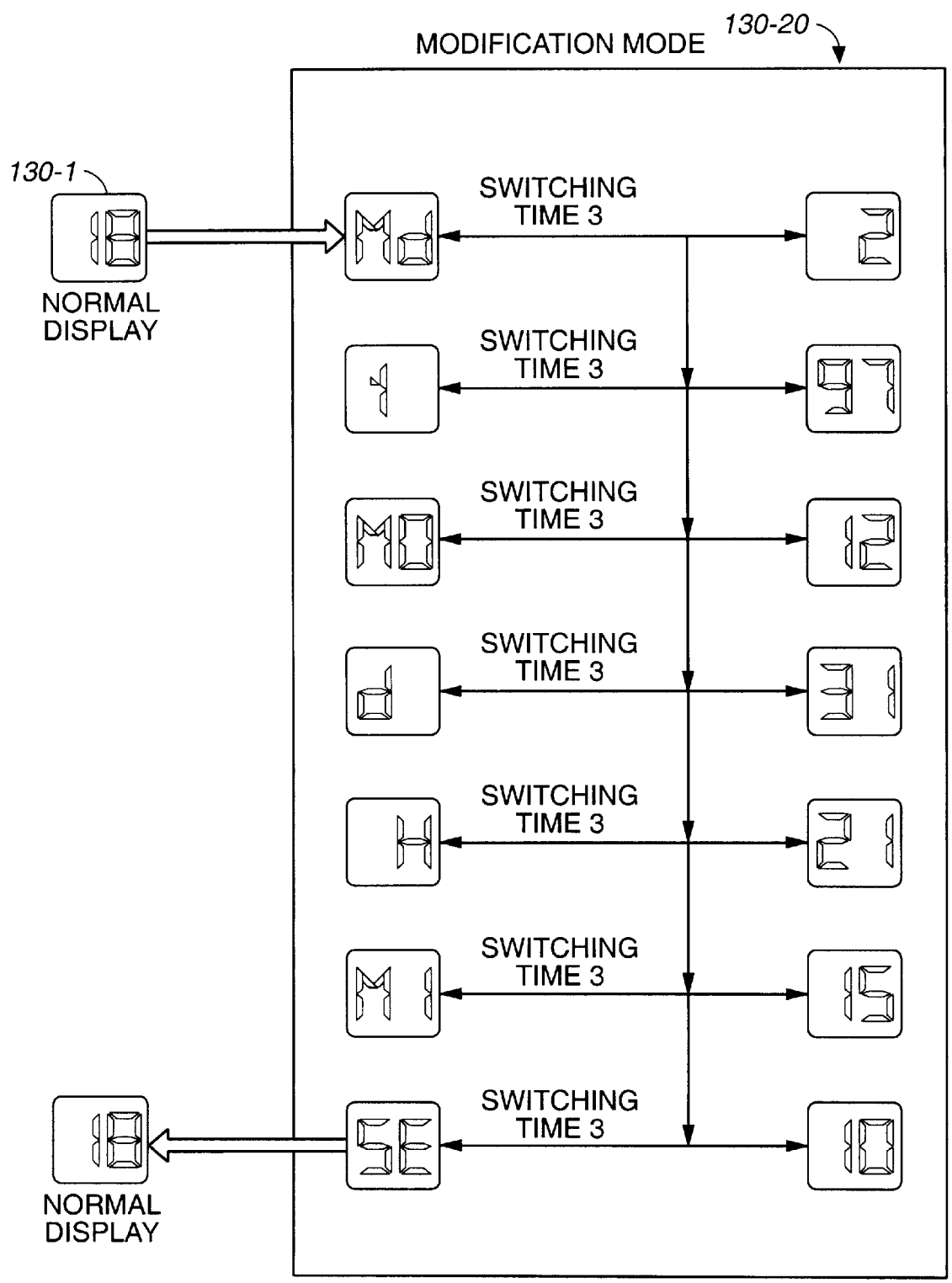
FIG._22

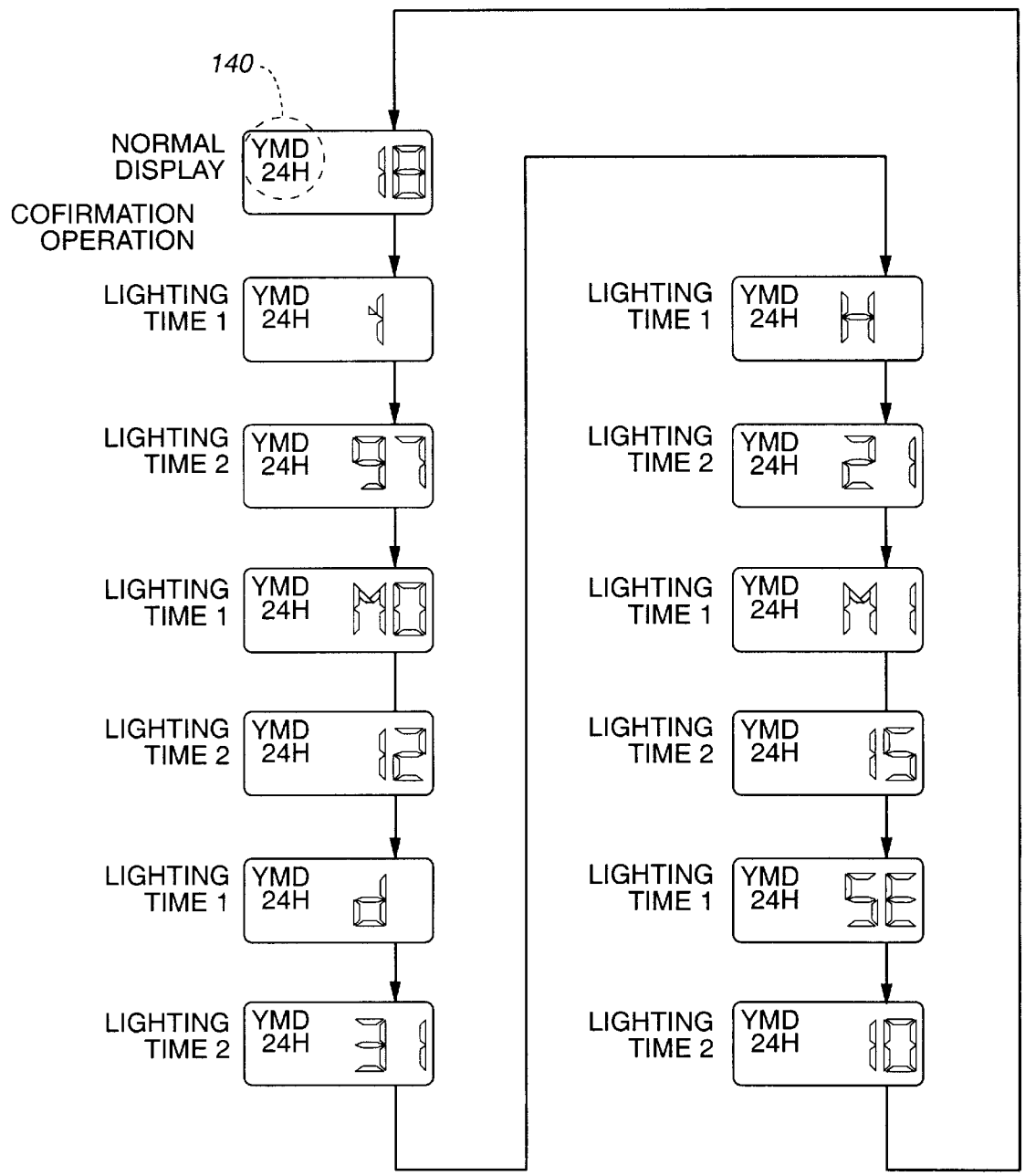
FIG._23

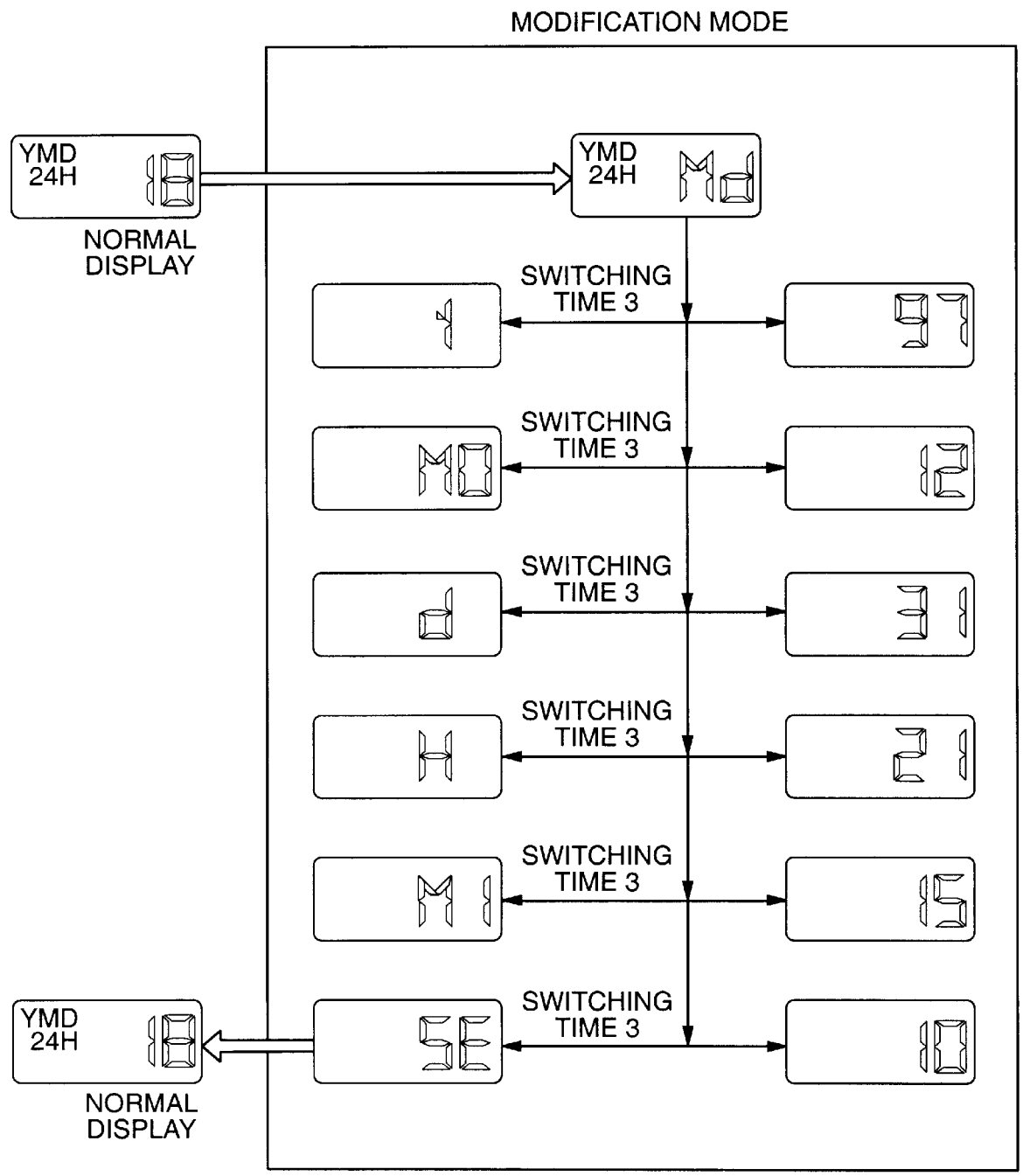
FIG._24

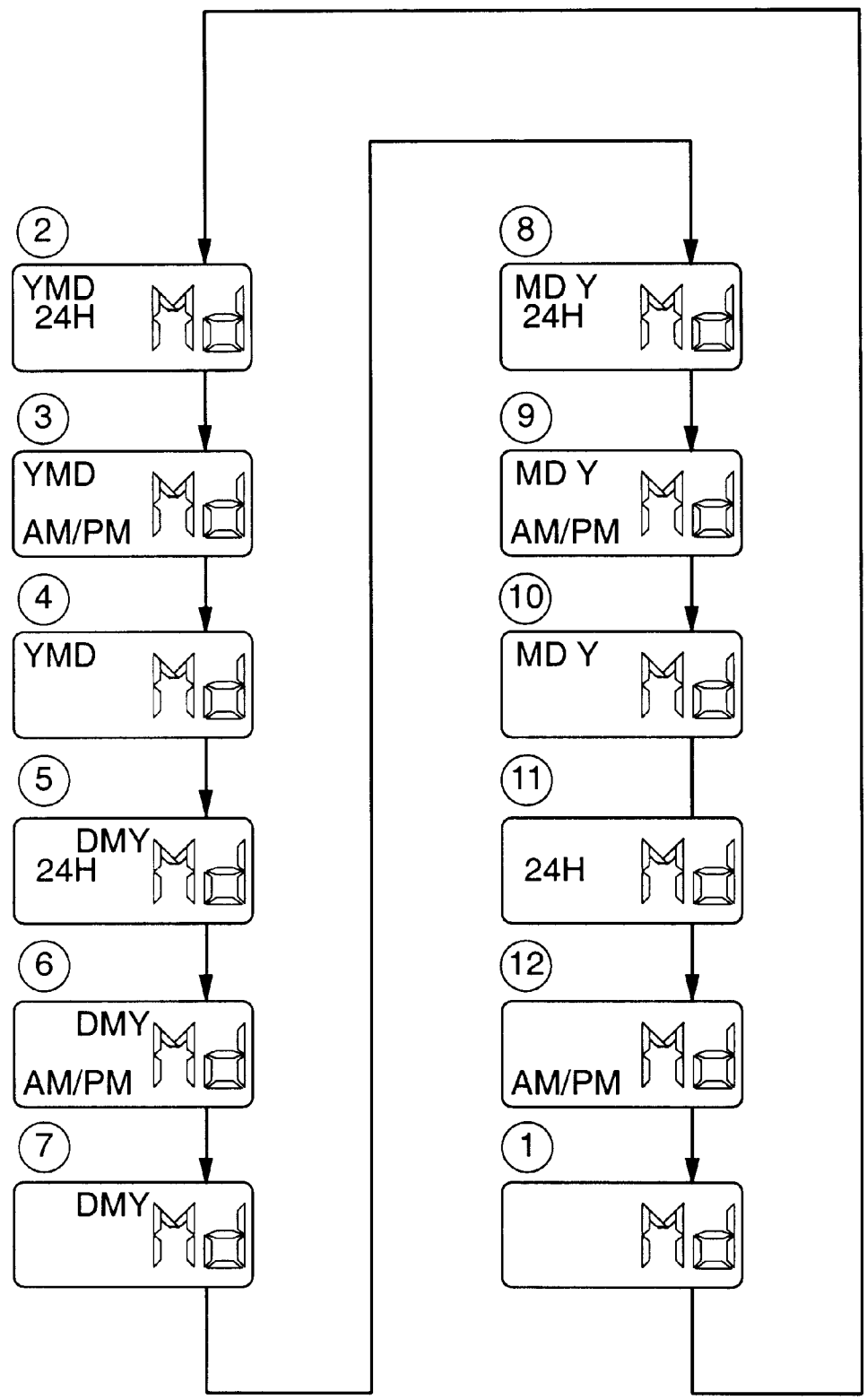
FIG._25

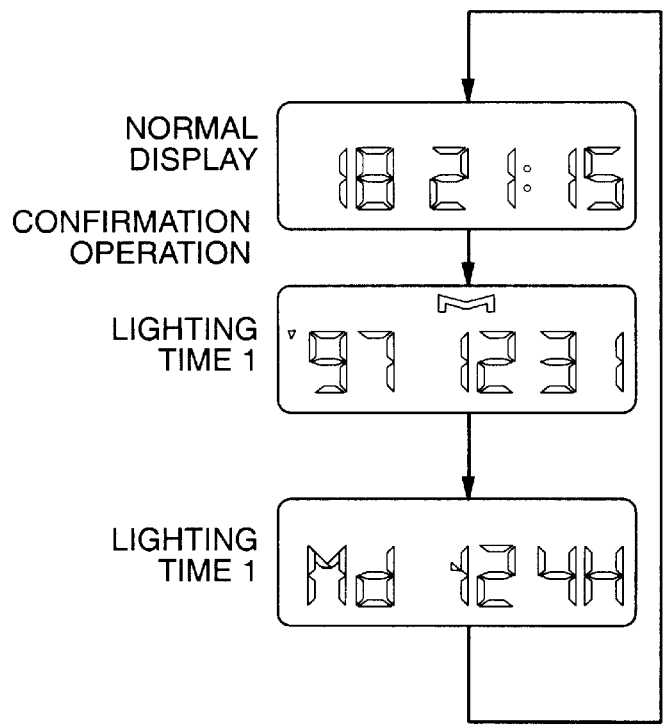
*FIG._26A*
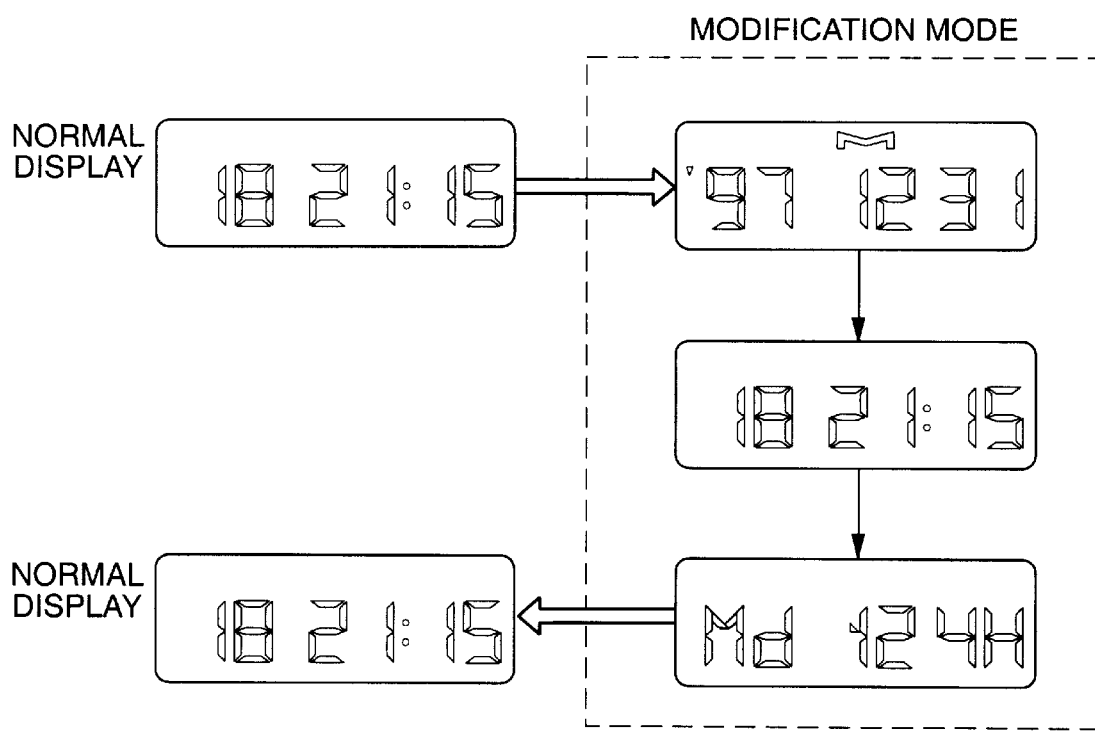
*FIG._26B*

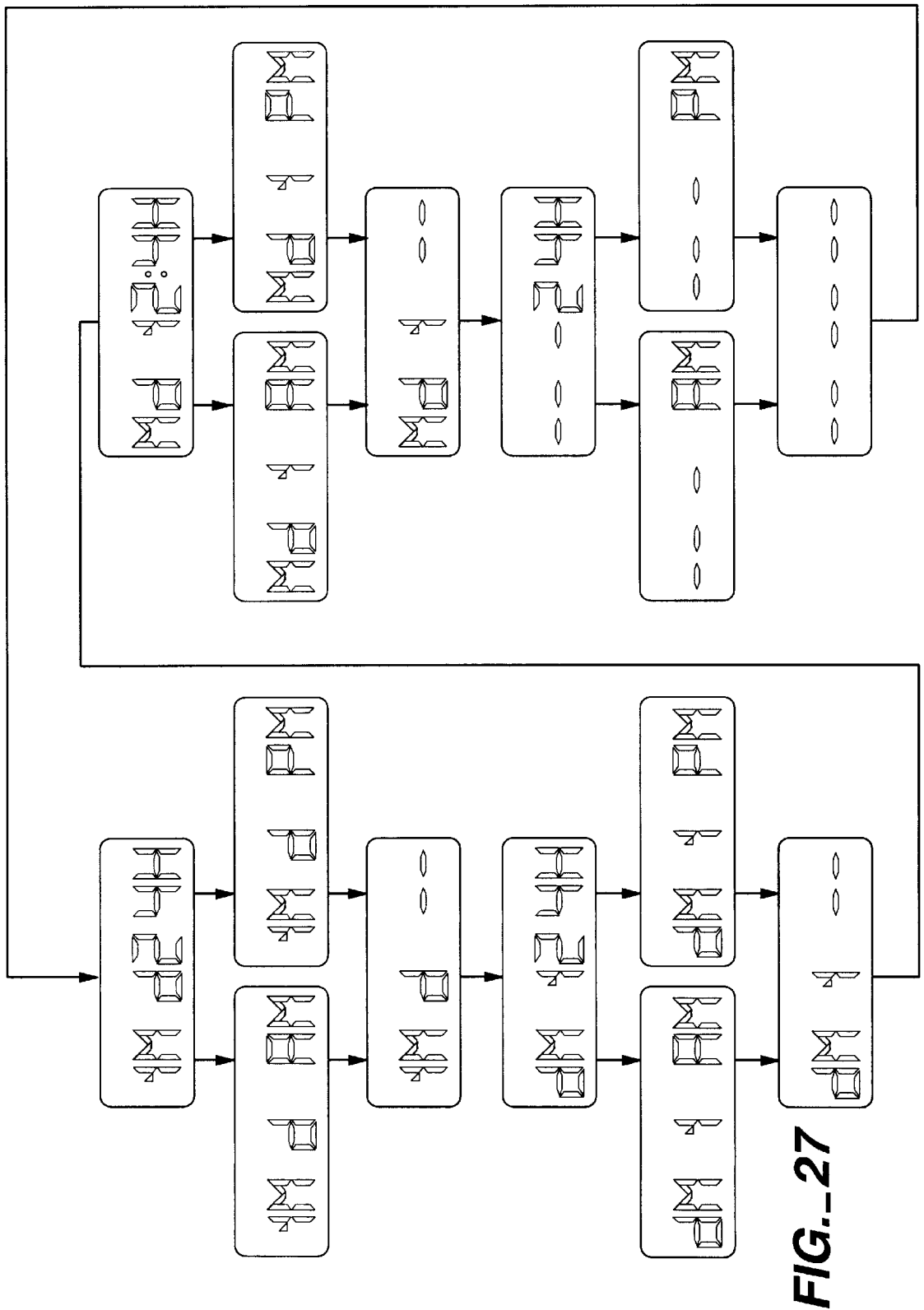
FIG._27

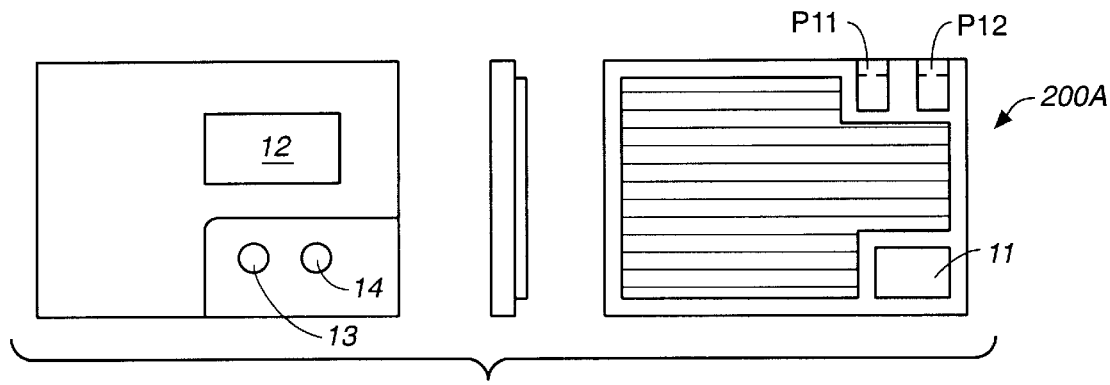
FIG._28A
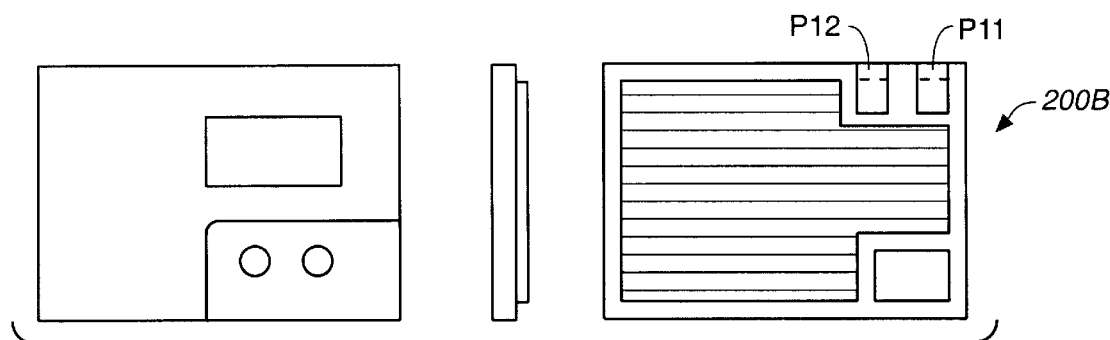
FIG._28B
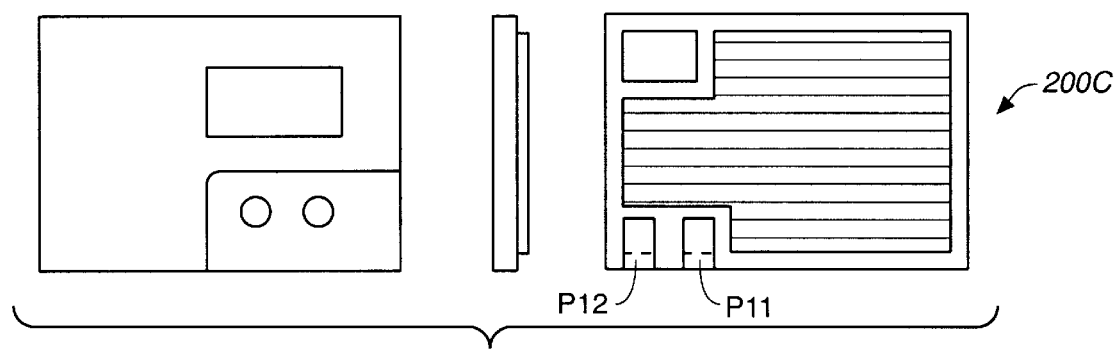
FIG._28C
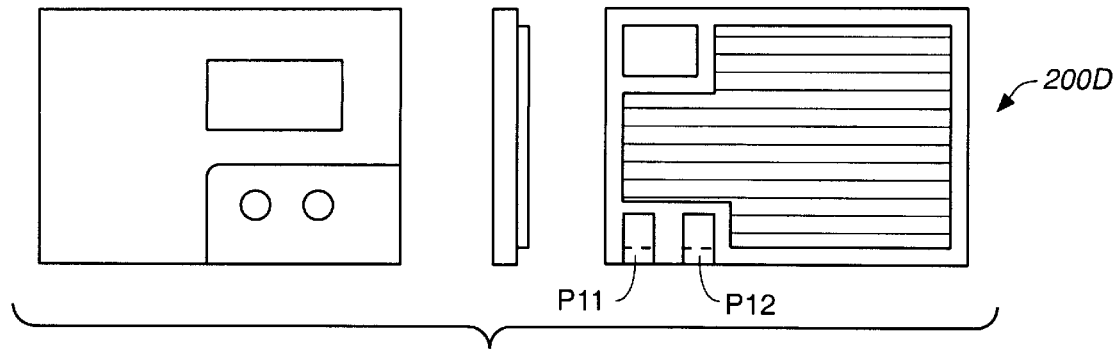
FIG._28D

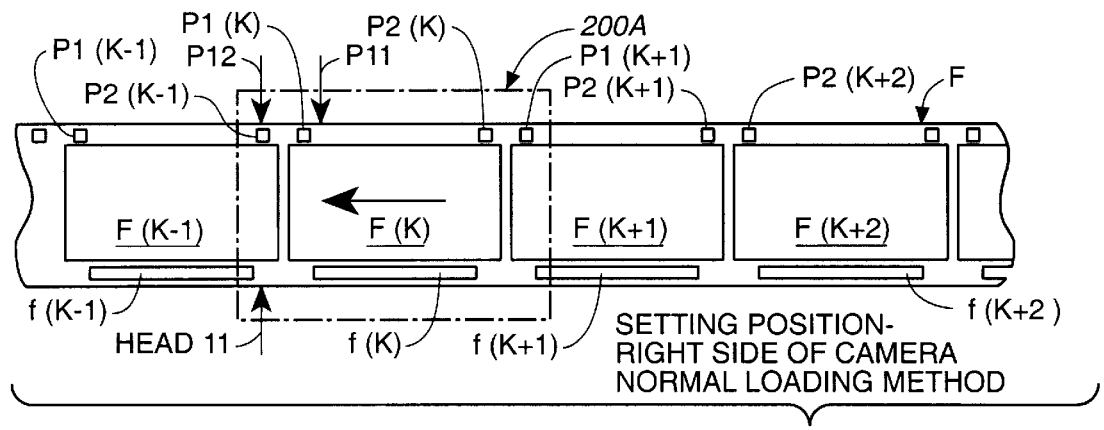
FIG._29A
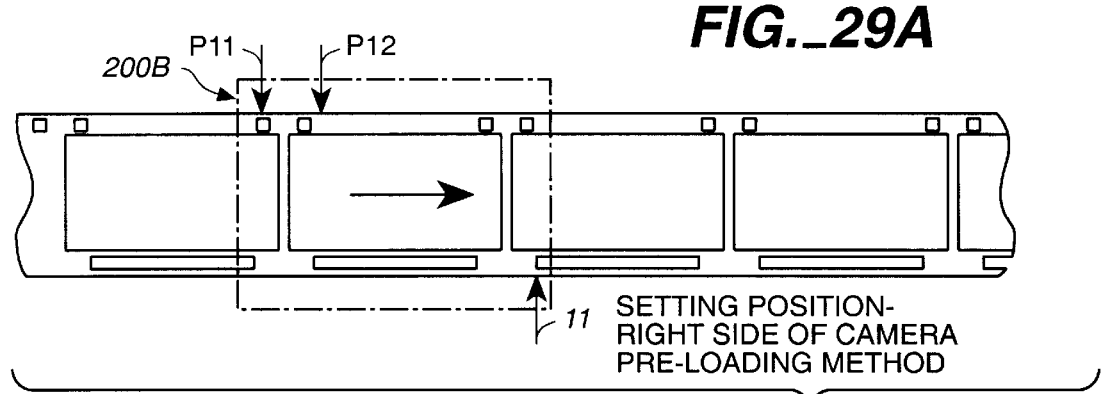
FIG._29B
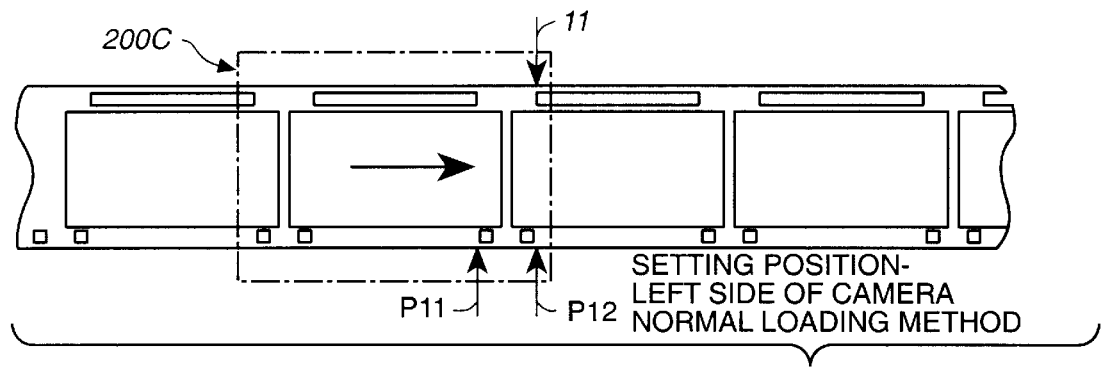
FIG._29C
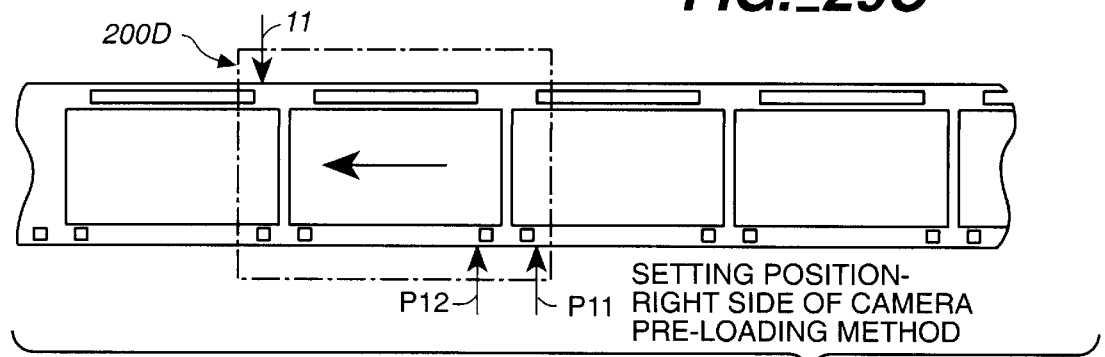
FIG._29D

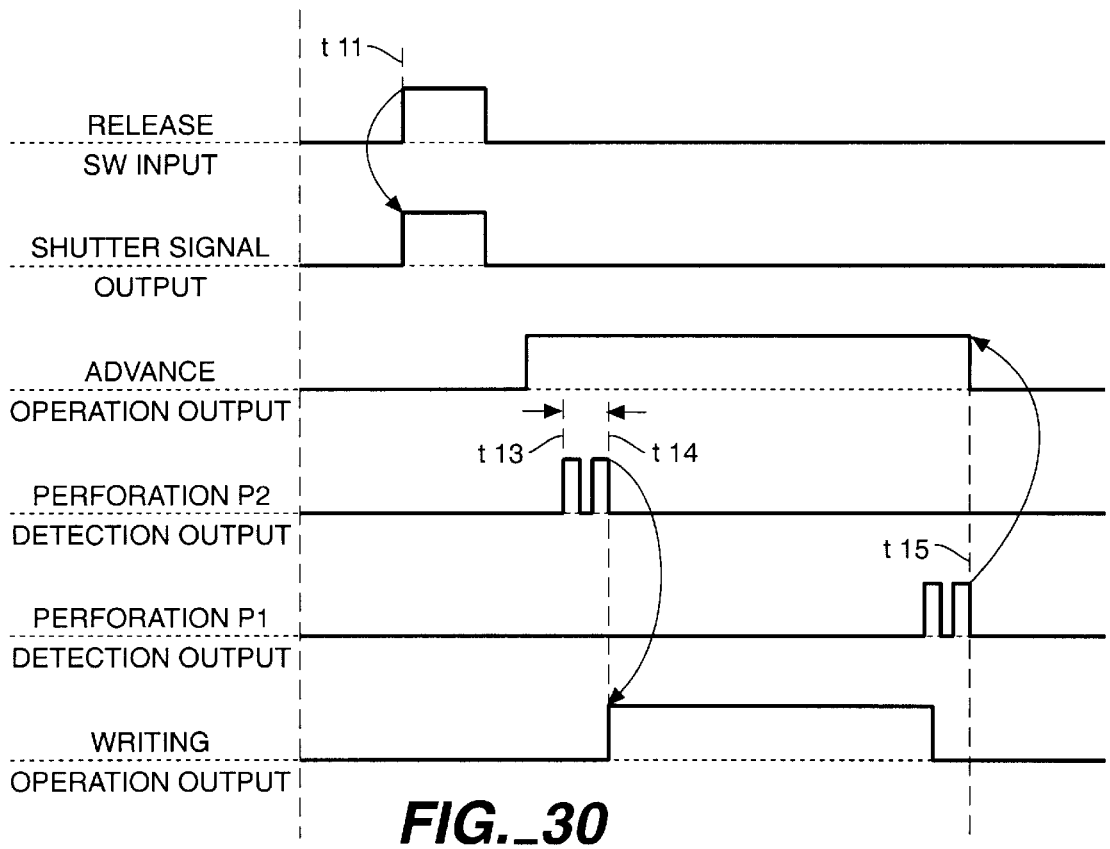
FIG._30
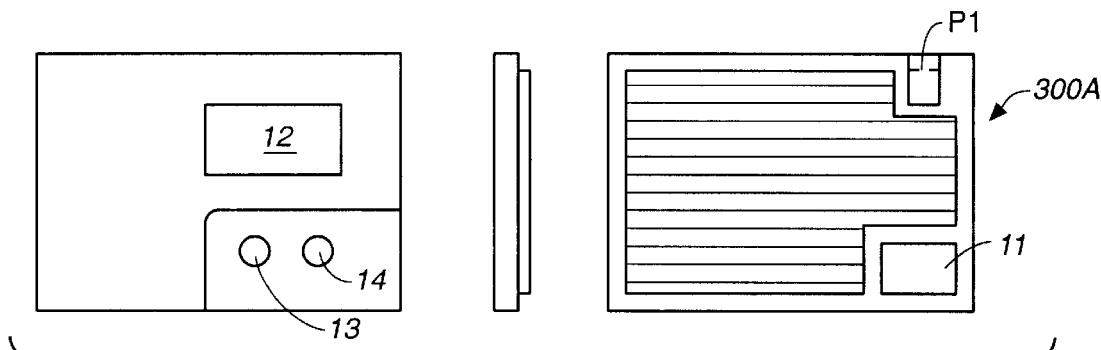
FIG._31A
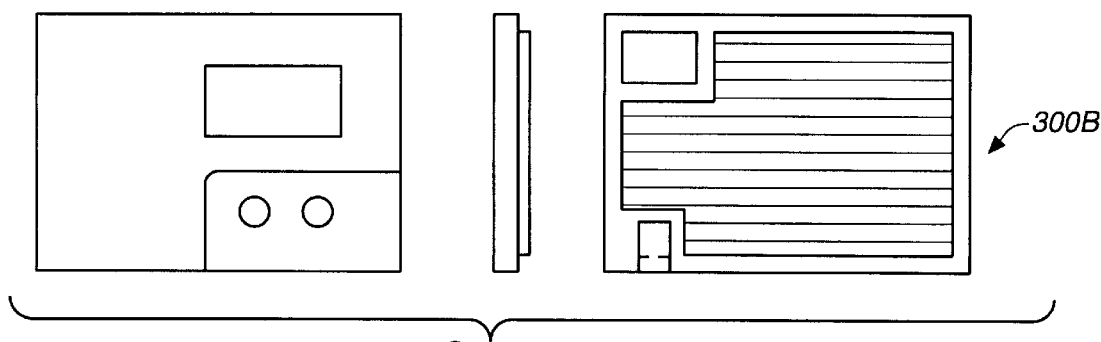
FIG._31B

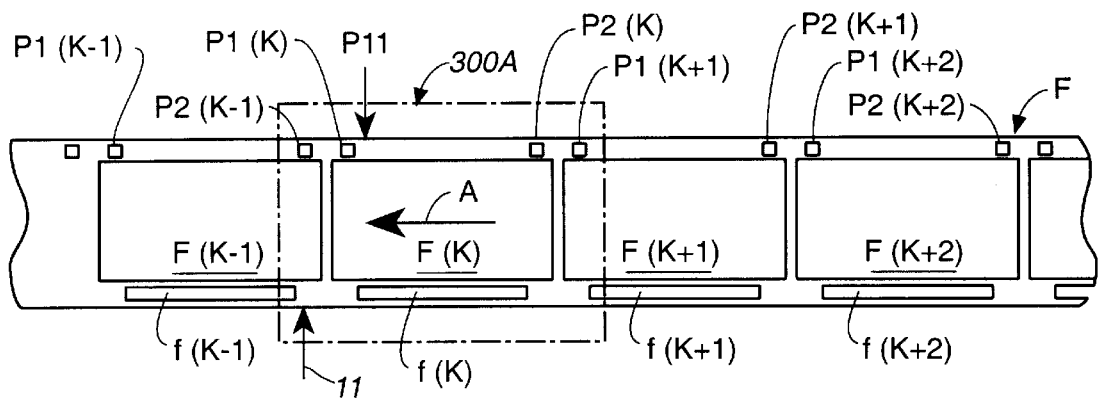
FIG._32A
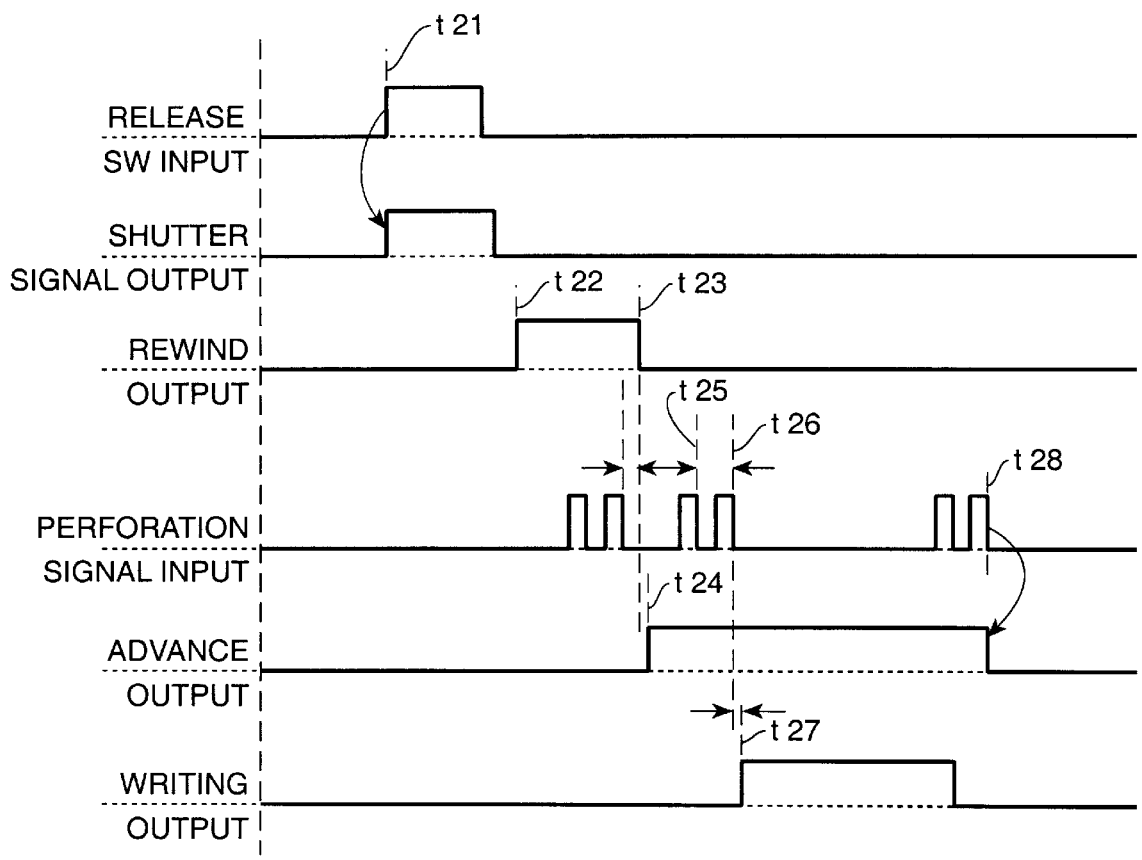
FIG._32B

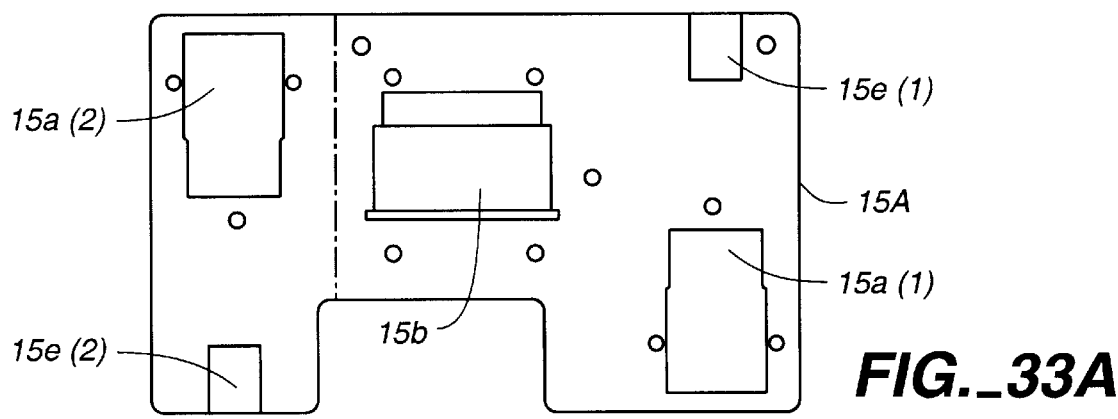
FIG._33A
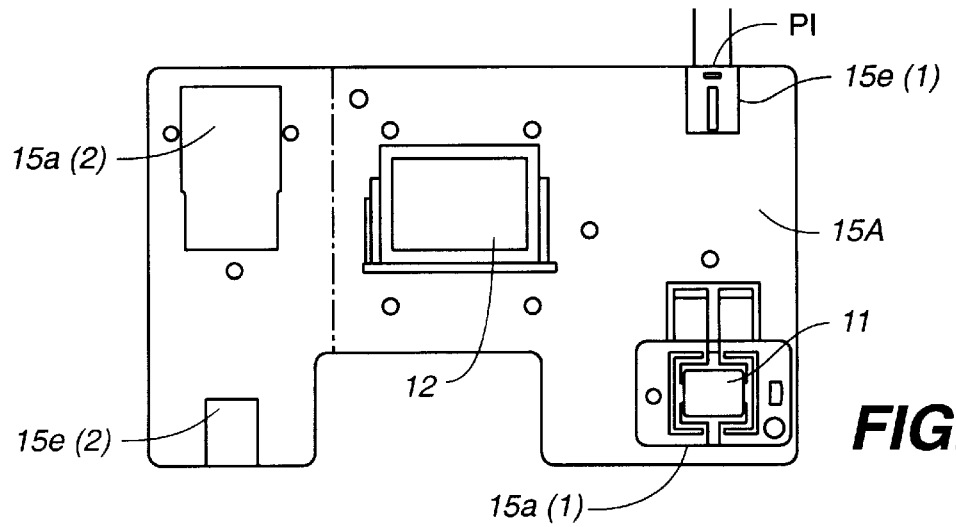
FIG._33B
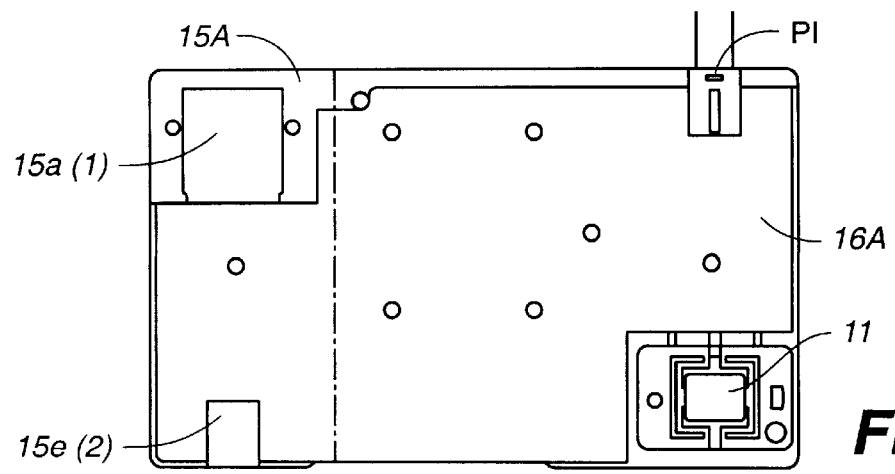
FIG._33C

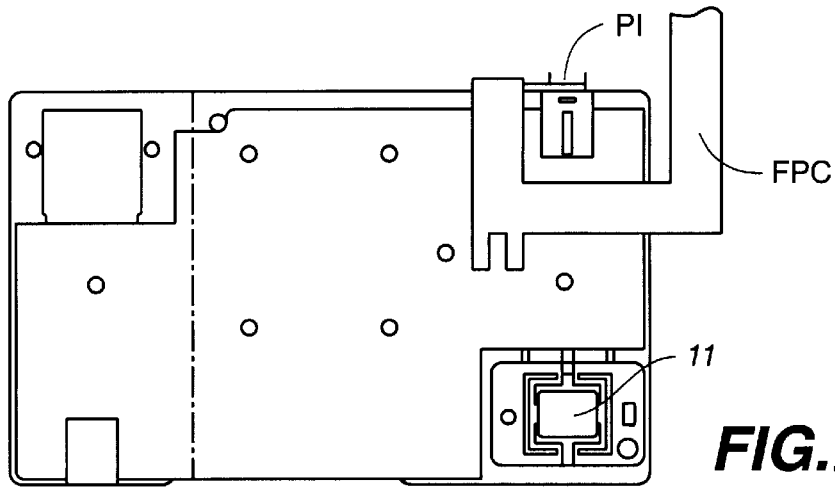
FIG._33D
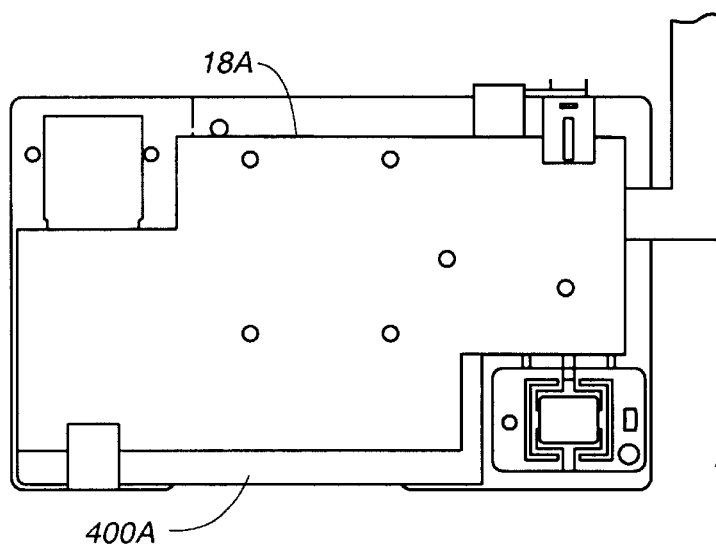
FIG._33E
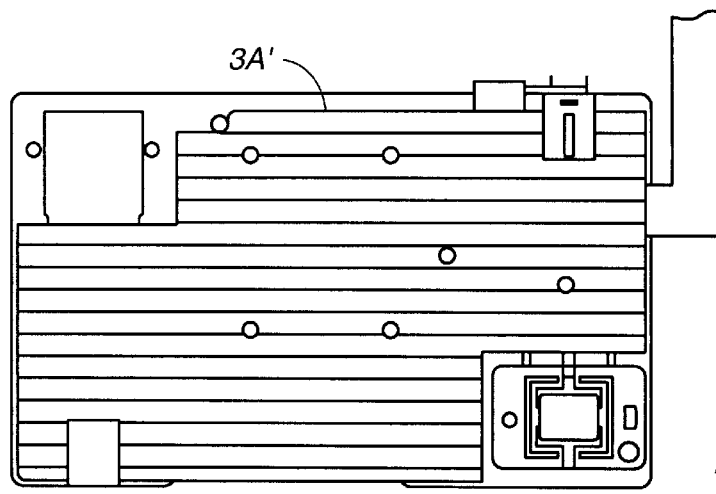
FIG._33F

CAMERA MODULE DEVICE FOR DATA RECORDING

BACKGROUND OF THE INVENTION

1. Field of the Invention

The invention relates to a camera module device for recording data that is mounted inside a camera main body and is equipped with a magnetic head for writing or both writing and recording such data as photographing date and time, into and from the magnetic recording area formed on the photographic film inside.

2. Description of the Related Art

Camera module devices for recording data have been known that project such data as photographing date and time onto photographic film at the time of photographing, etc. Such a device can be mounted onto a camera main body, and optically projects the data onto the photographic film in a state in which it is mounted onto the camera main body. In recent years, photographic film on part of which a magnetic recording track has been formed has become known, and camera module devices for data recording that write data into such photographic film have also been suggested.

For example, this kind of module device is disclosed in Japanese Patent Laid Open No. H6-138540, and comprises a communication function for exchanging signals with a control circuit installed in the camera main body and consisting of components such as a microcomputer, a storage means for temporarily storing the received recorded data, and a magnetic head.

During photographing, the data to be written is generated by the camera main body side. During data writing, the data to be written is output from the camera main body side, and at the same time a synchronization signal is output in linkage with the advancing operation of the photographic film, etc. The module device side receives these signals, and then uses a magnetic head to write data such as the photographing date and time supplied and the angle of view information into the magnetic recording track of the corresponding one frame of the photographic film, in linkage with the rewinding operation of the photographic film.

Such a camera module device for data recording has the problems described below.

First, although the device can be freely mounted on or removed from the camera main body, the data to be written by the magnetic head, the synchronization signal for driving the magnetic head, etc. must be generated by and received from the control circuit on the camera main body side. Consequently, it is necessary to embed circuits for implementing such functions in the camera main body side beforehand, thus increasing the cost of manufacturing the camera main body accordingly. Furthermore, the circuits embedded in the camera main body are wasteful to those users who do not need such functions.

Second, conventional camera module devices or camera main bodies are not equipped with a function for verifying the operation of the data writing function of said camera module device. Consequently, whether or not the writing operation was correctly performed can be checked only after the data is actually written and the photographic film is developed, which is inconvenient.

Third, in a camera module device equipped with a magnetic head, the magnetic head is installed in a fixed location. Consequently, if the camera main body side is not equipped with a function for temporarily reverse-feeding the photographic film immediately after photographing, a total of four kinds of module structures must be made available for the camera module device, in order to cope with cameras with different photographic film loading methods and different cartridge loading directions.

Fourth, the data to be recorded in the camera is displayed on the monitoring liquid crystal display panel installed in the camera module device. In the case of an optical camera module, because the volume of data to be projected is not that large, normally all of the projection data is always displayed on the liquid crystal panel at once. In contrast, a large volume of data can be recorded in a magnetic recording track. Consequently, the number of display digits of the liquid crystal panel must be increased in order to display all of the recorded data on the liquid crystal panel at once, which is uneconomical. However, no measures have been taken to address this issue so far.

OBJECTS OF THE INVENTION

The first object of the present invention is to suggest a camera module device for data recording that can write such data as the photographing date and time, into the magnetic recording area formed of the photographic film, without the need for installing a circuit area for data creation on the camera main body side.

The second object of the present invention is to suggest a camera module device for data recording that makes it possible to check whether or not the data writing by the magnetic head is being correctly performed, at the time of data recording.

The third object of the present invention is to suggest a camera module device for data recording that can use a shared module structure for handling different film-loading methods and cartridge loading directions on the camera main body side.

The fourth object of the present invention is to suggest a camera module device for data recording that can display a large volume of recorded data in an easy-to-view manner, using a liquid crystal display panel with a small number of display digits.

SUMMARY OF THE INVENTION

According to the present invention, the camera module device for data recording can be mounted onto a camera main body and writes data into the magnetic recording area formed on photographic film in a state in which said device is mounted onto the camera main body; and has a data-generation means for generating the data to be written into the recording area of the photographic film, a magnetic recording means for recording the data into the magnetic recording area of the photographic film, and a control means for driving and controlling said magnetic recording means to write the data.

The camera module device for data recording according to the invention thus configured includes a function for generating the data to be written. Therefore, it is not necessary to separately install such a function on the camera main body side, and a data generation process is executed when a write instruction signal is simply output toward the receiving means of the camera module device. Therefore, it is not necessary to make any special modifications in the specification of the camera main body side for recording data. Furthermore, since all that is needed for writing data is the receipt of a write instruction signal from the camera main body side, the function for communicating with the camera main body side can also be simplified.

Next, in the camera module device for data recording according to the present invention, said magnetic recording means is provided with a reading means for reading data from the magnetic recording area of the photographic film; and said control means is provided with a storage circuit for storing the write data to be written into said magnetic recording area, a comparison circuit for comparing the read data read from said magnetic recording area with said write data being held in said storage circuit after said write data has been written, and with a determination means for determining whether or not the data writing operation was successful based on the comparison result.

A camera module device for data recording having such a configuration can perform self-checking on whether or not the data writing operation by the magnetic head was successful. Therefore, whether or not data is correctly being written can be checked at the time of photographing, without the need for waiting for the film to be developed. As a result, a correct writing operation can always be guaranteed.

Next, the camera module device for data according to the present invention has a detection means for detecting the feeding state of the photographic film, and said detection means is provided with a photosensor for detecting the passage of the perforations formed in the photographic film being fed.

In a camera module device for data recording according to the invention thus configured, the write timing for the magnetic head can be determined based on the actual movement of the photographic film. Therefore, correct data can be always recorded in the magnetic recording area of the film that is being fed. Furthermore, the camera module device for data recording according to the invention can be installed and used even in a camera that has not been designed with the use of a camera module device for data recording in mind.

On the other hand, said magnetic recording means of the camera module device for data recording according to the invention is provided with a magnetic head, a pair of terminal plates consisting of blade springs supporting said magnetic head, and a circuit board on which a magnetic head drive circuit pattern, etc. have been formed; and said terminal plates are aligned in the photographic film advance direction, with one end of each said terminal plate flexibly and electrically contacting said circuit board and the other ends supporting said magnetic head.

In the camera module device for data recording according to the invention with the magnetic recording means thus configured, because the terminal plates of the magnetic head flexibly contact the circuit board, the conductivity between these components can be ensured. Furthermore, because the magnetic head is supported by a pair of terminal plates having elastic characteristics, it is possible to make the magnetic head contact the magnetic recording area of the photographic film while maintaining an appropriate level of pressure by appropriately setting the elastic characteristics at the positions of these terminals.

Additionally, the camera module device for data recording according to the invention has a monitoring liquid crystal display panel for displaying the recorded data, and said monitoring liquid crystal display panel and the magnetic head which is a configuration element of said magnetic recording means are positioned so as not to overlap in the thickness direction of the device. Use of such a configuration prevents external light from reaching the photographic film by passing through the magnetic head area from the monitoring liquid crystal display panel side. Furthermore, the magnetic field of the magnetic head can be prevented from adversely affecting the liquid crystal display panel.

Next, the camera module device for data recording according to the invention has first and second head-mounting areas for mounting said magnetic head, and these head-mounting areas are located in the positions of point symmetry in the device main body. When such a configuration is used, it becomes possible to cope with different cartridge loading directions on the camera main body side by changing the mounting position of the magnetic head. Therefore, it becomes unnecessary to provide module devices with the magnetic head located in different positions.

Next, the camera module device for data recording according to the invention has a monitoring liquid crystal display panel for displaying data, etc. to be written into said magnetic recording area and multiple selection switches for switching the display format of said monitoring liquid crystal display panel.

Here, said selection switches are preferably provided with first and second switches, so that the display format changes according to the first display routine when said first switch is used, and according to the second display routine when said second switch is used.

Because multiple switches are thus used for selecting the display format in the camera module device for data recording according to the invention, it is possible to set the desired display format easily and quickly.

Additionally, the camera module device for data recording according to the invention has a monitoring liquid crystal display panel for displaying data, etc. to be written into said magnetic recording area, and the display of the type, content, and sequence of the data can be switched. Use of this configuration makes it possible to display a large volume of recorded data, using a liquid crystal display panel with a small number of display digits.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

FIGS. 1A and 1B illustrate the state in which the camera module device according to the invention is installed in a camera main body, and FIG. 1C illustrates the configuration of photographic film.

FIGS. 2A and 2B illustrate the state in which a camera module device with an integrated platen is installed in a camera main body.

FIG. 3 is a disassembled perspective view showing the major areas of the camera module device of FIG. 1.

FIGS. 4A–E illustrate the assembly sequence of the individual configuration components of the camera module device of FIG. 1.

FIGS. 5A–C illustrate the top and side surfaces on the camera main body side and the top surface on the camera back lid side of the camera module device of FIG. 1.

FIGS. 6A–C extract and illustrate only the magnetic head area; FIG. 6A is the top-view diagram, FIG. 6B is a side-view diagram, and FIG. 6C is a cross-section diagram along line c—c.

FIGS. 7A and B illustrate the state in which the magnetic head is installed in a circuit board; FIG. 7A is a partial top-view diagram and FIG. 7B is a partial side-view diagram.

FIGS. 8A and B illustrate the state in which the film is passing through the magnetic head; FIG. 8A illustrates the state in which the film has just entered and FIG. 8B illustrates the state in which the magnetic head is writing data to or reading data from the passing film.

FIGS. 9A and 9B are partial schematic cross-section diagrams showing the positional relationship between the magnetic head and the monitoring liquid crystal display panel.

FIGS. 10A and 10B illustrate the positional relationship between the monitoring liquid crystal display panel and a group of switches.

FIG. 11 is a schematic block diagram of the control system installed in the camera module device.

FIG. 12A and 12B are schematic block diagrams showing the configuration of the head driver of the magnetic head.

FIG. 13 is a schematic block diagram showing the configuration of the head amplifier.

FIG. 14, 14A and 14B are a schematic flow diagram showing the operation during film loading on the camera main body side.

FIG. 15 is a schematic flow diagram showing the photographing operation on the camera main body side.

FIG. 16 illustrates the film feeding operation in the self-check mode of the camera module device during film loading.

FIG. 17 is a timing diagram showing the operations of writing and reading data in the self-check mode of the camera module device.

FIG. 18 is a signal diagram showing the magnetic head drive signal of the camera module device.

FIG. 19 is a schematic block diagram of the comparison circuit installed in the camera module device.

FIGS. 20A and 20B illustrate the display format of the monitoring liquid crystal display panel; FIG. 20A illustrates the write data switching operation, and FIG. 20B illustrates the display formats of individual operations.

FIG. 21 illustrates the format of the write data to be displayed by the monitoring liquid crystal display panel when the number of display digits is two.

FIG. 22 illustrates the display format when the monitoring liquid crystal display panel is in the data modification mode and the number of display digits is two.

FIG. 23 illustrates the data display format of a monitoring liquid crystal display panel equipped with a dedicated segment for showing data sequence.

FIG. 24 illustrates the display format when a monitoring liquid crystal display panel equipped with dedicated segments for showing data sequence is in the data modification mode.

FIG. 25 illustrates the data sequence switching operation.

FIGS. 26A and 26B illustrate the data display format of a monitoring liquid crystal display panel having six display digits.

FIG. 27 illustrates the display format of a data sequence using six display digits.

FIGS. 28A–28D illustrate the configuration of a camera module device related to Embodiment 2.

FIGS. 29A–29D illustrate the differences in cartridge loading directions and loading methods.

FIG. 30 is a timing diagram showing the photographing and writing operations of a camera module device related to the Embodiment 2.

FIGS. 31A ad 31B illustrate a modified example of the camera module device of Embodiment 2.

FIG. 32A and 32B illustrate the operation of the camera module device of FIG. 31; FIG. 32A illustrates the positional relationship between the photographic film and the individual areas of the camera module device; FIG. 32B is a timing diagram showing both the photographing and writing operations.

FIGS. 33A–33F illustrate the assembly sequence of yet another example of a camera module device according to the invention.

DESCRIPTION OF THE PREFERRED EMBODIMENTS

Embodiment 1

FIGS. 1A and 1B illustrate both the schematic configuration of the camera module device related to Embodiment 1 of the invention and the schematic configuration of the camera main body to which said camera module device is to be installed. In this figure, 1 indicates a camera module device, and 2 indicates the camera main body to which said camera module device is to be installed. Camera module device 1 is mounted onto the back side of camera main body 2 while being held between platen 3 positioned on the back side of camera main body 2 and camera back lid 4.

As a whole, camera module device 1 has a flattened rectangular shape; magnetic head 11 is installed on the front side (side facing the film) of said camera module device 1; and both monitoring liquid crystal display panel 12 for displaying recorded data, etc. to the outside and two selection switch terminals 13 and 14 used for operations such as switching of the data to be recorded are provided on the back side (side facing the camera back lid) of said camera module device 1. On the camera back lid 4, display window 41 is formed in the area that corresponds to liquid crystal display panel 12, and switch buttons 42 and 43 are provided in the locations that correspond to selection switch terminals 13 and 14, respectively. A switching signal is input by activating selection switch terminals 13 and 14 by operating said button switches.

FIG. 1C shows the configuration of photographic film F to be installed on the camera main body 2 side. As shown in this figure, individual frames F(n) (n=1, 2, 3, . . . ) of film F are arranged starting from its leading side. A narrow recording track (magnetic recording area) f(n) (n=1, 2, 3, . . . ) is formed below each frame F(n). Perforations P1(n) and P2(n) are formed in the front and rear corners above each frame F(n). The film advancing operation and the writing operation of magnetic head 11 are controlled by detecting these perforations P1(n) and P2(n).

Note that camera module device 1 could be configured such that platen 3A on the camera main body side is incorporated into the rear face of camera module device 1A, as shown in FIG. 2.

FIG. 3 shows a disassembled view of the individual configuration areas of camera module device 1 in the present embodiment. As shown in this figure, camera module device 1 is provided with frame plate 15, head-mounting area 15a formed inside said frame plate 15, magnetic head 11 mounted onto said head-mounting area 15a from inside, panel mounting area 15b formed in frame plate 15, monitoring liquid crystal display panel 12 mounted onto said panel mounting area 15b from inside, circuit board 16 on which various circuits including IC chips are mounted, and slender rectangular connector plate 17 for electrically connecting the circuits on said circuit board 16 with liquid crystal display panel 12.

FIG. 4 illustrates the assembly sequence of these individual configuration components. Frame plate 15 is provided as shown in FIG. 4A. As shown in FIG. 4B, magnetic head 11 and liquid crystal display panel 12 are mounted to mounting areas 15a and 15b, respectively, of frame plate 15 from inside. Next, circuit board 16 is overlaid on frame plate 15 as shown in FIG. 4A. A rectangular opening has been cut in circuit board 16, where magnetic head 11 will be mounted. When circuit board 16 is installed, magnetic head 11 becomes exposed through this opening area.

Through-holes for a large number of crimping pins 15c formed on the interior surface of frame plate 15 are formed in the components mounted on frame plate 15, except for magnetic head 11. After these components are mounted on frame plate 15, each component is fastened to frame plate 15 by crimping the head of each crimping pin 15c.

As shown in FIGS. 6A, B,C and 7A,B through-holes 11a and 111b through which positioning pins penetrate are formed in magnetic head 11. After the module is assembled, this magnetic head 11 is aligned by rotating it around through-hole 111a and is then fastened to frame plate 15 using an adhesive, etc. Protruding area 111c formed on magnetic head 11 is held between circuit board 16 and frame plate 15, thus preventing magnetic head 11 from falling while it is being fastened using an adhesive, etc.

Then, as shown in FIG. 4D, light-blocking sticker 18 is adhered to the back side of circuit board 16 so that external light can be completely blocked. In the case of camera module device 1A with an integrated platen as shown in FIGS. 2A and 2B, platen 3A is additionally overlaid on circuit board 16 and is fastened into a single unit using crimping pins.

FIG. 5 shows the front surface which faces the camera main body side, a side face, and the back surface which faces the camera back lid, of camera module device 1 in the present embodiment thus assembled. In this figure, multiple terminals 16a are exposed along the edge of circuit board 16 adjacent to selection terminals 13 and 14 on the back surface of device 1 where said selection terminals are exposed. These terminals 16a are used for connecting with the camera main body; and if they are left exposed to the outside even after camera module device 1 has been assembled, external inputs can be entered into camera module device 1 via these terminals. Furthermore, if a terminal is provided for leading the read signal by magnetic head 11 to the outside, it will be convenient for operations such as testing of device 1.

Configuration of the Magnetic Head

FIGS. 6A–6C extract and illustrate magnetic head 11 only. Magnetic head 11 is provided with backing plate 111 on which a rectangular opening has been formed in the center, magnetic head main body 112 positioned in said central opening, and two terminal plates 113 and 114 which supply the drive current for driving said magnetic head main body 112 and which support said head main body. Through-hole 111a through which the positioning pin formed on the frame plate 15 side penetrates and through-hole 111b for positioning are formed on backing plate 111.

As is clear from FIGS. 7A and B, in magnetic head 11 of the present embodiment, its two terminal plates 113 and 114 are formed using blade springs that are slightly bent toward circuit board 16, and their tips 113a and 114a electrically contact the circuit patterns formed on the surface of circuit board 16. In this way, the present embodiment uses the elasticity of two terminal plates 113 and 114 to ensure secure contact with circuit board 16.

Magnetic head 11 of the present embodiment is supported by backing plate 111 via areas 113a and 114a of two blade spring shaped terminal plates 113 and 114. The effects described below can be obtained by adjusting the elastic characteristics of these terminal plates 113a and 114a.

That is, as shown in FIG. 8A, in camera module device 1 mounted on the camera main body 2 side, its magnetic head 11 is positioned across from pad 21 installed on the camera main body 2 side and is additionally kept in contact with the pad surface by the elastic force of areas 113a and 114a of the two terminal plates. Film F installed in camera main body 2 is advanced from the film cartridge (not shown in the figure) installed on the camera main body side, and is transferred along the transfer route which passes between magnetic head 11 and pad 21. As shown in the figure, if the advancing direction (forward direction) of film F is the direction indicated by the arrow and if the opposite direction (retreating direction) is the rewind direction of the film, head 11 magnetically writes data into the magnetic recording area (track) formed on the surface of film F while said film F enters and passes through the space between head 11 and pad 21. Alternatively, data is read from said area.

When film F is about to enter the area between head 11 and pad 21, the film-entry side of magnetic head 11 retreats from pad 21, creating a gap for the film to pass through. During this step, the terminal plate on the film-entry side of magnetic head 11, e.g., area 113a of terminal plate 113 flexes, and then area 114a of terminal plate 114 flexes. Therefore, to ensure smooth entry of film F, the modulus of elasticity of area 113a of the terminal plate on the film-entry side needs to be small.

As explained above, in this embodiment, because magnetic head 11 is supported against backing plate 111 by areas 113a and 114a of the two blade spring shaped terminal plates, it is possible to smoothly enter film F by appropriately setting the moduli of elasticity of the terminal plates. The state in which film F passes between magnetic head 11 and pad 21 is shown in FIG. 8B, and the contact pressure of magnetic head 11 against film F can also be set to an appropriate value by the elastic force of areas 113a and 114a of the two terminal plates.

Note that if magnetic head 11 of the present embodiment, whose configuration is shown in FIG. 6, is not used, it is necessary to support pad 21 using a component possessing functions equivalent to those of areas 113a and 114a of the two terminal plates.

Furthermore, in the present embodiment, a hard material coating is applied to either the entire arc-shaped head surface 11a of magnetic head 11 or part of the surface area which the tip of entering film F contacts. Therefore, the friction on surface 11a of head 11 can be reduced. Note that various types of materials can be used for the hard coating.

Next, in camera module device 1 in the present embodiment, magnetic head 11 and liquid crystal display panel 12 are positioned so as not to overlap each other in the thickness direction. In other words, these two components are positioned in different locations in the horizontal direction of camera module device 1. The advantages described below can be obtained by adopting this positional relationship.

FIG. 9A shows the positional relationship between magnetic head 11 and liquid crystal display panel 12 that are adopted in camera module device 1 in the present embodiment. In contrast, FIG. 9B shows the positional relationship between magnetic head 11 and liquid crystal display panel 12 in a conventional camera module device. As shown in this figure, in the conventional example, magnetic head 11 and liquid crystal display panel 12 are installed in frame plate 15 so that the two components are located in the same position relative to the two sides of frame plate 15 or so that they overlap each other.

When magnetic head 11 and liquid crystal display panel 12 are positioned overlapping each other as in the conventional example, a risk exists that the light from liquid crystal display panel 12 may reach the film on the opposite side via the installation area of magnetic head 11. Conversely, the magnetic field leaking from magnetic head 11 may cause problems such as unstable display in liquid crystal display panel 12.

In contrast, in the present embodiment, magnetic head 11 and liquid crystal display panel 12 are separated in the horizontal direction as shown in FIG. 9A. Therefore, no light leaks from liquid crystal display panel 12 toward the film. No magnetic field leaking from magnetic head 11 will adversely affect liquid crystal display panel 12 or IC chip 160, either. Furthermore, because the wiring for liquid crystal display panel 12 is also positioned away from magnetic head 11, the external noise entering magnetic head 11 from the wiring is also reduced.

In addition to these advantages, horizontally separating magnetic head 11 and liquid crystal display panel 12 can minimize the thickness of camera module device 1, whereas overlaying these components in the thickness direction increases the thickness.

Note that in camera module device 1 in the present embodiment, selection switches 13 and 14 are provided below liquid crystal display panel 12 as shown in FIG. 10. Positioning selection switches 13 and 14 below panel 12 in this way offers the advantage of allowing the user to easily operate the switch terminals even while observing the display on the panel.

Control System

FIG. 11 schematically illustrates the configuration of the group of circuits that constitute the control system installed on circuit board 16 of camera module device 1 in the present embodiment. IC chip 160 as well as various circuit patterns and circuit elements surrounding it are mounted on circuit board 16. Roughly grouping the components, the circuit area formed inside the IC chip includes control circuit 161 which performs the central control function, comparison circuit 162 for self-checking, an operation clock, and clock circuit 163 for generating the data to be displayed and written, as shown in the figure. The IC also includes head driver 164 for driving the magnetic head, amplification circuit 167 for the signal read from the head, and LCD driver 165 for driving the liquid crystal display panel.

Data switching signals are entered from switch terminals 13 and 14 formed on the circuit board into control circuit 161. Control signals are input into signal terminals X1, RD1, PN1, PN2, etc. of input port 166 from control circuit 22 on the camera main body 2 side; and the driving power is supplied via drive power supply terminals Vdd and Vss.

FIG. 12A and B shows a circuit configuration example of the aforementioned head driver 164. FIG. 13 shows the circuit configuration of amplification circuit 167 for the signal read from the head. These circuit configurations are basically the same as those normally used.

As shown in FIG. 12A, in head driver 164 in the present embodiment, a constant-current drive circuit is configured by supplying constant voltage Vr which occurs on the (-) side of the preset Vdd to NOT circuits NOT1 and NOT2 which supply drive control signals to switching P-channel MOS transistor 1 and P-channel MOS transistor 2 for driving head 11, thus preventing excessive current from being supplied to the head coil and preventing a rapid decline in the power supply voltage from causing IC malfunctions. As shown in FIG. 12B, setting the logical levels of the drive voltage to be supplied to individual terminals a, b, c, and d as described below causes the current to flow in the directions of arrows A and B via the head coil, reversing the direction of the magnetic field for writing data. On the other hand, in the amplification circuit shown in FIG. 13, analog switch SW is turned ON during magnetic data reading, forming a grounded state.

Data Reading and Reading Writing Operations

In camera module device 1 in the present embodiment, the data to be written into the magnetic recording area of film F is generated under the control of control circuit 161 which comprises a CPU provided inside the IC chip. This data is then written into film F via magnetic head 11 and the magnetic data that has been recorded in film F is read via head 11. Therefore, the camera main body need not be equipped with functions (creation and editing functions) for generating such data, as would be required in a conventional camera. A communication function for sending such data from the main body to camera module device 1 can also be omitted. Therefore, the price of the camera main body can be reduced.

The present embodiment is also provided with a self-check function for determining whether or not a writing operation by magnetic head 11 is correctly being performed. Performing self-check during film loading guarantees that a writing operation is always performed correctly. This self-checking can of course be executed for each frame, and can also be used for testing during the assembly of a camera main body having no corresponding self-check function, and thus is extremely useful.

FIGS. 14, 14A, 14B, 15 and 16 show the operations of writing and reading data in a camera in which device 1 of the present embodiment has been installed. These operations are explained below with references to these figures. Note that these operations are implemented by executing the control program stored in a storage circuit such as ROM that is pre-embedded in the IC chip of camera module device 1. Likewise, the operations of the camera main body are also executed by activating the control program embedded in the ROM inside the microcomputer that constitutes the camera's control circuit.

The self-check mode and the photographing modes are explained below with a focus on the operations of camera main body 2. First, after the drive power supply for camera main body 2 is turned on, whether or not film F has been installed is determined (step ST1 in FIG. 14A). If film F has been installed, the camera shifts to the photographing mode shown in FIG. 15. If film F has not been installed, the camera waits for film F to be installed (step ST2). After film installation, signal RD1 is pulled down to the low logical level (step ST3).

This signal RD1 is used for shifting camera module device 1 into the self-check mode, and camera module device 1 shifts into the self-check mode when this signal goes low.

In this self-check mode, first an advancing operation of the installed film F begins, and at the same time, timer counting for controlling film advancing and rewinding operations begins (step ST4).

Note that magnetic recording area f0 has been formed along the bottom edge of the first frame F0 on the leading side of film F, as shown in FIG. 16. The time required for advancing film F up to the leading position f0a of this magnetic recording area f0 is controlled by timer counting. Count value t0 is the time required by the leading position of the magnetic recording area of film F to reach magnetic head 11 of camera module device 1. When leading position f0a of magnetic recording area f0 of film F reaches the position of magnetic head 11 (step ST5), camera main body 2 outputs pulse signal X1 which indicates the start of a writing operation to camera module device 1 (step ST6).

When the camera module device 1 side receives this pulse signal X1, it creates the current date data under the control of control circuit 161, and uses magnetic head 11 to write that data into magnetic recording area f0.

Film F is transferred to the advancing direction (forward direction) while data is being recorded on it by magnetic head 11. When timer counting reaches count value t1 which indicates that end f0b of magnetic recording area f0 has been reached, it is judged that end f0b has reached magnetic head 11 (step ST7), and a rewinding operation (transfer to the retreating direction) of film F begins (step ST8). Next, when timer count value reaches t2, it is judged that film F has been rewound past lead f0a of its recording area f0 (step ST9), and an advancing operation (transfer to the forward direction) of film F begins (step ST10). When lead f0a of magnetic recording area f0 is detected with timer count value reaching t3, pulse signal X1 which indicates the start of a reading operation is output to camera module device 1 (step ST12).

When the camera module device 1 side receives this pulse input, it begins a data reading operation and reads from magnetic recording area f0, the magnetic data that was written via magnetic head 11 during the aforementioned film advancing operation.

When timer counting advances to count value t4 which indicates that end f0b of magnetic recording area f0 of film F has reached the position of magnetic head 11 (step ST13), signal RD1 is pulled up to the high logical level (step ST14).

When camera module device 1 detects the rise in the signal level, it cancels the self-check mode and shifts to the normal data-recording mode. However, as explained below, camera module device 1 will not shift to the normal data-recording mode if a write error is detected.

The camera main body 2 side then continues the advancing operation of film F, and stops this operation (step ST16) when the lead of the first frame F1 is detected (step ST15). Timer counting is then reset (step ST17).

The camera then shifts to the normal photographing mode shown in FIG. 15. In this photographing mode, one frame's worth of film F is advanced (flow from step ST22 through step ST26) whenever photographing takes place (step ST21). When all frames have been used for photographing (step ST26), film F is rewound.

Note that when the camera is in this photographing mode, camera module device 1 will have shifted to the normal data-recording mode as explained above, and uses magnetic head 11 to magnetically record data such as the photographing date in magnetic recording areas F1, F2, . . . (see FIG. 16) which have been formed below the exposed frames, in linkage with the advancing of a single frame of film F which is performed after each photograph is taken. This recording operation is started by the input from the camera main body 2 side, of pulse signal X1 which indicates the start of a writing operation (step ST23).

Note that in the present embodiment, the write operation is performed by magnetic head 11 asynchronously, without receiving from camera main body 2 side, a signal synchronized with the film advancing operation.

FIG. 17 shows the timing diagram of signals RD1 and X1, and of the writing and reading operations performed by magnetic head 11 of camera module device 1, etc.

Although the film transfer operation performed during film installation is controlled based on timer count in the above explanation, it is naturally not necessary to use timer count if the camera main body is provided with a position-detection function for detecting the leading and ending positions of each frame of film F.

As described above, camera module device 1 shifts to the self-check mode during film installation based on signal RD1 from camera main body 2, writes the data for checking in magnetic recording area f0 of the first frame F0 of film F, and then reads the written data again. The written data and read data are compared by comparison circuit 162 to determine whether or not they match. If they match, the writing operation by magnetic head 11 is judged to have been normal, and camera module device 1 shifts to the normal data-recording mode. However, if the two pieces of data do not match, the writing operation is judged to have been faulty, a message indicating the problem is displayed, and the process is terminated. Therefore, camera module device 1 does not shift to the normal data-recording mode, and no data recording operation is executed during subsequent photographing.

Next, camera module device 1 in the present embodiment is provided with clock circuit 163 as described above. The frequency that is output from its embedded oscillation circuit, e.g., 32 kHz, is divided (N−1) times to generate a clock signal of 32/N (kHz) frequency; and control of the writing operation by magnetic head 11, and the comparison operation by comparison circuit 163, etc. are performed based on this generated clock signal.

FIG. 18 shows the write signal (head drive current) for magnetic head 11 in the present embodiment, that is based on the NRZ (NON RETURN TO ZERO) method. Signal S0 indicates data "0"; and, in the waveform shown, when a certain amount of unit time "t" elapses after the head current reverses (from + to −), the head drive current is reversed again (from − to +) and held in that state for an amount of time equaling three times unit time "t". The + direction of the head current is, for example, the direction indicated by arrow A in the head driver shown in FIG. 12, and the −direction is the direction indicated by arrow B.

In contrast, signal S1 indicates data "1"; and, in the waveform shown, after staying low for an amount of time equaling three times unit time "t", the head drive current rises to "+" and is held in that state for unit time "t".

As explained above, the write signal in the present embodiment and consequently the signal read from magnetic recording area f0 indicates data "0" if the first ¼ of period T which indicates a single piece of data is at the low logical level and the remaining ¾ of the period is at the high logical level; or indicates data "1" if the first ¾ of the period is at the low logical level and the remaining ¼ of the period is at the high logical level.

Next, FIG. 19 shows a schematic circuit configuration of comparison circuit 162 of camera module device 1 in the present embodiment. In this figure, clock signal T0 as well as signal R read by magnetic head 11 and amplified by head amplifier 167 are supplied to detection circuit 171. Read signal R supplied here is supplied to both header data detection circuit 172 and latch circuit 173. Header data detection circuit 172 is used for detecting header data (start signal) from read signal R. Read signal R supplied to latch circuit 173 is latched here.

Read signal R is also supplied to determination circuit 174. The output of write data latch circuit 175 is supposed to be supplied to this determination circuit 174. A specified amount of data from write data signal W written by magnetic head 11 has been latched to write data latch circuit 175 beforehand.

When camera module device 1 shifts to the self-check mode during film installation as described above and writes the data for checking, write signal W becomes latched to write data latch circuit 175. When the written data is subsequently read, and the header data (start signal) is read during the read operation and detected by header data detection circuit 172, the amount of read data signal R corresponding to the aforementioned specified amount of data becomes latched to latch circuit 173. After the read data is latched, the signals latched to both latch circuits 173 and 175 are compared by determination circuit 174. An output indicating whether or not the write data and read data match each other is output to control circuit 161. When control circuit 161 receives a signal indicating a match, it switches the operation mode to the normal data-writing mode. However, if it receives a signal indicating a mismatch, it maintains the operation mode, prevents the shift to the normal data-writing mode, and stops the operation. Therefore, camera module device 1 will not work in this case, as described above.

Switching of Write Data

As explained above, a pair of switch terminals 13 and 14 are provided on the camera back lid side of camera module device 1. Activating these switch terminals by operating switches 42 and 43 provided on the camera back lid generates a write data switching signal and supplies it to control circuit 161. Based on this switching signal, write data switching is performed by control circuit 161. The write data is displayed on monitoring liquid crystal display panel 12 of camera module device 1, and the user can see this data through display window 41 on camera back lid 4.

In device 1 in the present embodiment, data can be written in 12 ways based on combinations of year/month/day display formats (four types) and hour/minute display formats (three types), as shown in Table 1 below.

TABLE 1

Year, month, day 1-1 Display in month, day, and year sequence
1-2 Display in day, month, and year sequence
1-3 Display in year, month, and day sequence
1-4 No display
Total 4 types Hour, minute 2-1 24-hour system display
2-2 AM/PM display
2-3 No display
(Total of 3 types)

Switching among these 12 write display formats is done using two switch terminals 13 and 14 as explained below.

FIG. 20A shows how the display format of monitoring liquid crystal display panel 12 changes based on the operations of switch terminals 13 and 14. This display format shows the write data and thus illustrates the procedure for switching the write data. As shown in this figure, the display format switches between the first display routine 100 and the second display routine 200 based on the input of switching signal SW1 generated by operating switch terminal 13. The display format also changes cyclically between display routines 100 and 200 as indicated by the arrows, based on the input of switching signal SW2 generated by operating switch terminal 14. That is, display routine 100 corresponds to the changes among the three hour/minute display formats in Table 1 above, and display routine 200 corresponds to the changes among the four year/month/day display formats in Table 1.

In this way, device 1 of the present embodiment makes it possible to simply and quickly select the desired display format from as many as 12 possibilities, using two switch terminals 13 and 14. In contrast, a conventional device of this type is equipped with only a single selection switch, and the display format is changed by repeatedly pressing this switch. Consequently, it is sometimes necessary to press the switch as many as 11 times before the desired display format is reached, which is inconvenient. The present embodiment can eliminate this inconvenience involved in switching operations.

Note that in the present embodiment, the last display format is held in both display routines 100 and 200. Suppose that signal SW1 is input when the display format is (2-2) in display routine 200, switching the routine to display routine 200. If the routine is switched from display routine 200 back to display routine 100 again, the display will return to (2-2) which was the last display format, as indicated by the dotted line in the figure. Likewise, when the routine is switched from display routine 100 to display routine 200, the last display format that was in effect in display routine 100 will be restored.

FIG. 20B shows the display format of monitoring liquid crystal display panel 12 while camera module device 1 is active. Display format 121 is the display format when camera module device 1 has shifted to the self-check mode. When this self-checking has determined that the write operation was normal, the display format shifts to that indicated by number 122, or to that indicated by number 123 if the write operation was abnormal. In the write operation mode, part of the display segment is designed to flash while data is being written, indicating that fact. This state is shown in number 124. Of course, individual display formats may be different from those shown in the figure.

Of the signals supplied to camera module device 1 of the present embodiment, PN1 and PN2 specify angle of view, and the desired print angle of view is magnetically recorded based on the potentials of these signals. Table 2 shows examples of combinations of angle of view specifications and signal potentials.

TABLE 2

| Specified angle of view | PN1 | PN2 |
|---|---|---|
| High definition | H | H |
| Normal | H | L |
| Panorama | L | L |

Another Display Format Example of the Liquid Crystal Display Panel

As explained above, the data to be written into magnetic recording area f(k) is related to the day of photographing, etc. In principle, it would be ideal if all of the data to be written could be displayed on monitoring liquid crystal display panel 12 according to the writing sequence.

However, displaying all of the data at once would require a liquid crystal display panel equipped with a large number of display digits. Particularly, if the amount of information recorded in magnetic recording area f(k) is large, a large liquid crystal display panel equipped with a large number of display digits would be required if all of the information must be displayed at once, which is not economical. Another alternative would be to increase the amount of information that could be displayed by reducing the display letter size. However, such a method would make the display difficult to read.

Therefore, when using a liquid crystal display panel having a small number of display digits such as two, the data requiring constant checking is preferably displayed all the time while that not requiring constant checking is preferably displayed at certain time intervals or displayed as needed using a switch so that such data can be checked.

Here, if only part of the recorded data can be displayed, it would be preferable to install a dedicated segment, to use a union jack, or to adopt scrolling, in order to check the recorded data sequence, etc.

FIG. 21 shows an example of the recorded data display format when liquid crystal display panel 12 has two display digits. In this case, normal display 130-1 shows the number of frames that have been used. Then, the sequence, type, and content of the recorded data can be confirmed by switching the display as needed. That is, normal display state 130-1 is switched to the confirmation display mode for a certain amount of time after the power supply is turned on or continuously at certain intervals, by operating switch terminals 13 and 14. In the confirmation display mode, "year", "month", "day", "hour", "minute", and "second" data need to be selected and displayed according to the data sequence.

To confirm the content of the data to be displayed, display the data after "Y" indicating "year", "MO" indicating "month", "d" indicating "day", "H" indicating "hour", "MI" indicating "minute", and "SE" indicating "second" are displayed.

The sequence and content of the recorded data in the example shown in FIG. 21 are "1997 December 31, 21 hours 15 minutes 10 seconds". In the confirmation operation mode, the display state sequentially changes from display 130-2 toward 130-13 each time it is lit for a pre-specified amount of time. After the display state changes to display 130-13, it goes back to normal display state 130-1 again.

FIG. 22 shows the display control routine for modifying the recorded data in the 2-digit display format described above. Normal display mode 130-1 of display panel 12 is switched to modification mode 130-20 using a switch operation. In this modification mode 130-20, the display first switches to "Md" which indicates the mode for modifying the recorded data sequence. A recorded data sequence is specified using switch operations in this state.

Note that 12 recorded data sequences as shown in FIG. 25 described below are available. Therefore, in the recorded data sequence modification mode, the number corresponding to the desired sequence can be selected using switch operations.

Performing switch operations then modifies the data in the order of the recorded data sequence. In the example in the figure, modifications are made in the order of year, month, day, hour, minute, and second. Note that the display will alternate between data content and data type during modification.

In the display format shown in FIG. 23, dedicated segment 140 for indicating data sequence has been added to the display format of FIG. 22. The modification mode of this case is shown in FIG. 24. In this case, the display format of dedicated segment 140 changes in 12 ways as shown in FIG. 25. "Y", "M", and "D" indicate "year", "month", and "day", respectively; "24H" indicates "24-hour system"; and "AM/PM" indicates "AM/PM system". The mode in which none of these is displayed is used when data recording is not desired.

Next, FIGS. 26A and 26B show the recorded data display format when monitoring liquid crystal display device 12 has six display digits. In the example shown in this figure, normal display shows both frame count and hour:minute. When the display device shifts to the confirmation mode, it switches to the data display that shows other data, and data sequence, etc. When the display device shifts to the modification mode, it cyclically displays the individual display states, enabling modification operations. In this case, there are basically 12 data sequences as shown in FIG. 27, and these can be selected by cyclically switching the display.

As explained above, if a display format and a display control format are adopted in which only part of the recorded data is displayed using monitoring liquid crystal display panel 12, instead of displaying it all at once, and in which the display is cyclically switched to display the sequence, type, and content of the recorded data as needed, it is possible to use a liquid crystal display panel with a small number of display digits for confirming the recorded data.

Embodiment 2

FIG. 28A shows Embodiment 2 of the camera module device to which the invention has been applied. Camera module device 200A shown in this figure is basically the same as the camera module device related to Embodiment 1 described above. Camera module device 200A differs in that two photosensors PI1 and PI2 for detecting the feeding status of photographic film F are installed in it.

The type of camera main body that can use this camera module device 200A must have a structure in which the loading direction of the cartridge of photographic film F is to the right side of the camera main body, and in which the loading method is the normal type. That is, this camera module device can be applied when film F is fed one frame at a time in the direction of arrow A for photographing, as shown in FIG. 29A.

FIG. 30 shows the operation of a normal wind camera in which camera module device 200A has been installed and in which the film cartridge loading direction is to the right. First, as shown in this figure, a shutter drive instruction is issued synchronously with the operation of the release switch (at time t11) on the camera main body side, and a single frame photograph is taken. For example, an image is projected onto frame F(k), shown with an arrow in FIG. 29A. Next, a drive instruction is issued to the film-feeding motor on the camera main body side after a certain amount of time (at time t12), and the film advance operation begins.

The positions of magnetic head 11 and two photosensors PI1 and PI2 of camera module device 200A relative to film F at the start of film advance are indicated by the up and down arrows in FIG. 29A. When photographic film F is advanced, perforation P2(k−1) of the spent frame F(k−1) first passes through the detection position of photosensors PI2, followed by perforation P1(k) of photographing frame F(k).

The control circuit of camera module device 200A measures the time between the passing of these two perforations, i.e., the time between time t13 and t14 in FIG. 30, and computes the film feeding speed based on the measured value. Furthermore, synchronously with detection time t14 for perforation P1(k), an instruction is issued for magnetic head 11 to write data into magnetic recording area f(k) of the film. The writing frequency (speed) is set based on the computed film feeding speed.

When the photographic film is continuously advanced, perforation P2(k) of frame F(k) passes through the detection position of photosensor PI1, followed by perforation P1(k+1) of the next photographing frame F(k+1). Synchronously with time t15 at which this perforation P1(k+1) has completely passed through, an instruction to stop the advancing of film F is issued. As a result, the next frame F(k+1) becomes the photographing frame. That is, frame F(k+1) moves to the position of frame F(k) in FIG. 29A and stops there.

From then on, photographing and writing operations by the magnetic head are continued by repeating the above-described operations.

As explained above, camera module device 200A in the present embodiment is equipped with photosensors PI1 and PI2 for detecting perforations P1 and P2 of film F. Therefore, the write timing for magnetic head 11 need not be received from the camera main body side.

Note that, in a conventional case, a signal linked to a release switch or to a film-feeding motor that is output from the camera main body side is received, and such a signal is used to determine the write timing for the magnetic head. Consequently, the camera module device cannot be used for cameras not equipped with terminals for outputting such signals, which is inconvenient. In contrast, camera module device 200A in the present embodiment can be used even for cameras not equipped with terminals for outputting such signals.

Furthermore, camera module device 200A in the present embodiment directly detects the feeding status and feeding speed of photographic film F (whether or not the film is being fed), and uses this result to determine the write timing and write speed of magnetic head 11. Therefore, it is possible to avoid errors in which the magnetic head malfunctions and begins writing data despite the fact that no photographic film has been fed. It is also possible to avoid problems in which correct magnetic recording cannot be executed due to a mismatch between the writing speed of magnetic head 11 and the feeding speed of photographic film F.

Note that camera module device 200A in the present embodiment is equipped with two photosensors PI1 and PI2 for detecting the film feeding status as explained above. Therefore, the drive control of the film-feeding motor installed on the camera main body side can also be performed from the control circuit of camera module device 200A.

Camera module device 200A can be applied to cameras in which the cartridge loading direction is to the right, and which use the normal loading method. To use this camera module device 200A in a camera with a different cartridge loading direction and a different loading method, simply change the installation locations of magnetic head 11 and of the two photosensors PI1 and PI2.

That is, FIG. 28B and FIG. 29B show camera module device 200B which can be used in a pre-loading type camera in which the cartridge loading direction is to the right. Likewise, FIG. 28C and FIG. 29C show camera module device 200C which can be used in a normal-loading type camera in which the cartridge is loaded on the left side. FIG. 28D and FIG. 29D show camera module device 200D which can be used in a pre-loading type camera in which the cartridge is loaded on the left side. In any of these cases, all that is needed is to change the installation locations of magnetic head 11 and of the two photosensors PI1 and PI2.

Modified Example of Embodiment 2

FIG. 31A shows camera module device 300A related to a modified example of camera module device 200A described above. As can be seen from the figure, camera module device 300A in the present embodiment is equipped with only a single photosensor PI. The rest of the configuration is the same as that of camera module device 200A.

Camera module device 300A with this configuration works as explained below to detect the feeding status (feeding speed, etc.) of photographic film F, to control the write timing of magnetic head 11, and to control the drive of the film-feeding motor.

First, the type of camera main body that can use this camera module device 300A must have a structure in which the loading direction of the cartridge of photographic film F is to the right side of the camera main body, and in which the loading method is the normal type. That is, camera module device 300A can be applied when photographic film F is fed one frame at a time in the direction of arrow A" for photographing, as shown in FIG. 32A.

The operations of camera module device 300A will be explained with reference to FIG. 32B. First, a shutter drive instruction is issued synchronously with the operation of the release switch (at time t21) on the camera main body side, and a single frame of photograph is taken. For example, an image is projected onto frame F(k), as indicated by the arrow A" in FIG. 32A.

Next, an instruction is issued after a certain amount of time (at time t22) to drive the film-feeding motor on the camera main body side and to rewind the film. The film rewind operation causes perforation P1(k) of photographing frame F(k) and perforation P2(k−1) of the spent frame F(k−1) to pass through the detection position of photosensor PI. When a certain amount of time has passed after this perforation P2(k−1) has completely passed through, an instruction to stop the rewinding operation of film F is issued (at time t23) and the rewinding stops.

Then, after a certain amount of time has passed, an instruction to advance film F is issued (at time t24), and film advancing begins. This advancing operation causes perforation P2(k−1) and P1(k) to pass through the detection position of photosensor PI in that order and to be detected (at times t25 and t26). Based on the time between these detection times, the control circuit of camera module device 300A computes the film feeding speed and determines the writing speed (frequency) for magnetic head 11 that is appropriate to the film feeding speed.

Next, after a certain amount of time following time t26, a drive instruction is issued to magnetic head 11 (at time t27) which then writes data into magnetic recording area f(k).

Afterwards, synchronously with time t28 at which perforation P1(k+1) of the next photographing frame F(k+1) is detected, an instruction to stop the film advancing operation is issued. As a result, the next frame F (k+1) becomes the photographing frame. From then on, photographing and writing operations by the magnetic head are continued by repeating the above-described operations.

Camera module device 300A of the present embodiment thus configured can provide the same effects as camera module device 200A described above, and offers the additional benefits described below.

First, since the write timing of magnetic head 11 and the feeding of the photographic film can be controlled using a single photosensor PI, the device configuration can be made that much more simply and inexpensively.

Additionally, since it is not necessary to use two photosensors, two kinds of module structures can be used to cope with different cartridge loading directions and loading methods on the camera main body side. That is, it is sufficient to provide camera module device 300A shown in FIG. 31A and camera module device 300B shown in FIG. 31B. Camera module device 300A can be used if the cartridge loading direction is to the right side of the camera main body, regardless of the loading method. Conversely, camera module device 300B can be used if the cartridge loading direction is to the left side of the camera main body, regardless of the loading method.

Modified Example of Camera Module Device 300A

By modifying the configuration of camera module device 300A described above, it is possible to provide a camera module device that can be used with different cartridge loading directions or loading methods.

FIGS. 33A–33F show camera module unit 400 equipped with such a configuration. As shown in FIG. 33A, liquid crystal display panel mounting area 15b is formed in the approximate center of frame plate 15A of camera module unit 400. On both sides of this mounting area, magnetic head-mounting area 15a(1), photosensor mounting area 15e(1), magnetic head-mounting area 15a(2), and photosensor mounting area 15e(2) are formed in a state of point symmetry. Magnetic head 11 and photosensor PI are mounted in one of the magnetic head-mounting areas and one of the photosensor mounting areas, respectively. If the cartridge loading direction on the camera main body side is to the right, magnetic head 11 and photosensor PI are mounted in magnetic head-mounting area 15a(1) and photosensor mounting area 15e(1), respectively. Conversely, if the cartridge loading direction is to the left, magnetic head 11 and photosensor PI are mounted on the other side.

Next, circuit board 16A having a point symmetric shape is installed as shown in FIG. 33C. Signal lines such as those on a flexible printed circuit board FPC are then connected to circuit board 16A, as shown in FIG. 33D. The position for installing these signal lines is also formed at a point symmetry position.

Note that after the above step, light-blocking sticker 18A is adhered to the back side of circuit board 16A, as shown in FIG. 33E. Camera module device 400A has now been completed. In the present embodiment as well, for a platen-integrated type, platen 3A' is installed on the back side of circuit board 16A as shown in FIG. 33F.

It is possible to use camera module device 400A in the present embodiment thus configured for different cartridge loading directions on the camera main body side by merely changing the installation locations of magnetic head 11 and photosensor PI using common components. Therefore, the present embodiment provides an advantage in that it is not necessary to provide two module structures.

Industrial Field of Potential Application

As explained above, because the camera module device according to the present invention is provided with a function for generating the data to be written, it is not necessary to add such a function to the camera main body side. Therefore, it is not necessary to install any special circuit on the camera main body side, making it that much less expensive. Nor it is necessary to provide a communication function for sending the data to be written that is created and edited on the camera main body side, and this also allows the camera main body side to be less expensive.

Additionally, the camera module device according to the present invention is provided with a self-check mode that determines whether or not the writing operation by the magnetic head is normal by comparing the actual data that has been written with the data that is being written at the time of film loading. Therefore, correct data writing can always be ensured.

Furthermore, the camera module device according to the present invention is provided with a detection means for detecting the feeding status of the photographic film. Therefore, the write timing, etc. of the magnetic head can always be accurately controlled based on the result of this detection means. Driving of the film feeding motor on the camera main body side can also be controlled.

On the other hand, the camera module device according to the present invention uses a configuration in which the magnetic head is supported to the circuit board side via a pair of terminal plates consisting of blade springs. Therefore, it is possible to ensure electrical connection between the terminal plates and the circuit board, and to always maintain the magnetic head against the photographic film in the proper state, regardless of the film feeding direction.

Next, the camera module device according to the present invention uses a configuration in which the monitoring liquid crystal display panel for displaying the recorded data and the magnetic head are positioned so as not to overlap each other in the thickness direction of the device. Use of this configuration allows the thickness of the device to be reduced and can also prevent leaked light or leaked magnetic field from causing problems.

Additionally, the camera module device according to the present invention is provided with first and second head-mounting areas for mounting the magnetic head, and these head-mounting areas are located on the device main body in a state of point symmetry. Use of this configuration offers an advantage in that, by merely changing the mounting position of the magnetic head, the device can handle different cartridge loading directions and loading methods on the camera main body side.

Next, in the camera module device according to the present invention, the display format of the monitoring liquid crystal display panel which displays the data, etc. to be written into the magnetic recording area can be switched using multiple selection switches. Therefore, the desired data can be quickly displayed and operations such as data modification can also be performed simply.

Furthermore, in the camera module device according to the present invention, the display format of the monitoring liquid crystal display panel, which displays data, etc. to be written into the magnetic recording area, can be switched between two modes. The first is the normal display mode which displays part of the data to be written into the magnetic recording area or displays a different content. The second is the confirmation display mode which can sequentially switch among displays of the sequence, type, and content of data. Therefore, it becomes possible to use a liquid crystal display panel with a small number of display digits that cannot display all data at once as the monitoring liquid crystal display panel.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A camera module device for data recording mountable onto a camera main body and for writing data onto a magnetic recording area formed on photographic film in a state in which said device is mounted onto the camera main body, said camera module device comprising:

magnetic recording device to record data onto the magnetic recording area, wherein said magnetic recording device comprises a magnetic head; and frame plate having first and second head-mounting openings for mounting said magnetic head;

wherein a centerpoint is defined at an intersection of a horizontal centerline of said frame plate and a vertical centerline of said frame plate;

wherein said first and second head-mounting openings are located in positions of point symmetry with respect to the centerpoint of the frame plate; and wherein said magnetic head is mounted at one of said first and second head-mounting openings.

2. A camera module device for data recording according to claim 1, further comprising:

detection means for detecting a feeding state of the photographic film, wherein sad detection means comprises at least one photosensor for detecting the passage of a perforation formed in the photographic film being fed;

first and second sensor-mounting areas for mounting said photosensor that are located at a positions of point-symmetry in the frame plate; wherein said photosensor is mounted on one of said first and second sensor mounting areas.

3. A camera module device for data recording mountable onto a camera main body and for writing data onto a magnetic recording area arranged on photographic film in a state in which said device is mounted onto the camera main body, said camera module device comprising:

data-generation means for generating the data to be written onto the magnetic recording area of the photographic film;

magnetic recording means for recording the data onto the magnetic recording area of the photographic film;

control means for driving and controlling said magnetic recording means to write the data;

wherein said magnetic recording means comprises a reading means for reading data from the magnetic recording area of the photographic film; and wherein said control means comprises:

a storage circuit for storing write data to be written onto said magnetic recording area, a comparison circuit for comparing read data read from said magnetic recording area with said write data being stored in said storage circuit after said write data has been written, and determination means for determining whether the data writing operation was successful based on the comparison result;

detection means for detecting a feeding state of the photographic film, wherein said detection means comprises at least one photosensor for detecting the passage of a perforation formed in the photographic film being fed;

wherein said control means controls the driving of said magnetic recording means and the feeding of the photographic film, and wherein said magnetic recording means comprises a magnetic head;

frame plate having first and second head-mounting openings for mounting said magnetic head;

wherein a centerpoint is defined at an intersection of a horizontal centerline of said frame plate and a vertical centerline of said frame plate;

wherein said first and second head-mounting openings are located in positions of point symmetry with respect to the centerpoint of the frame plate; and wherein said magnetic head is mounted at one of said first and second head-mounting openings.

4. A camera module device for data recording according to claim 3, further comprising:

a pair of terminal plates comprising a plurality of blade springs supporting said magnetic head, wherein one of said pair of terminal plates comprises an end portion of a film-entry side of magnetic head;

wherein said pair of terminal plates are aligned in a photographic film advance direction, with one end of each said pair of terminal plates flexibly and electrically contacting said circuit board and the other end supporting said magnetic head, and wherein a modulus of elasticity of said one end portion is smaller than the other one of said pair of terminal plates.

5. A camera module device for data recording according to claim 3, further comprising:

first and second sensor-mounting areas for mounting said photosensor that are located at a position of point-symmetry in the frame plate; wherein said photosensor is mounted on one of said first and second sensor mounting areas.

* * * * *